United States Patent
Nguyen et al.

(10) Patent No.: US 10,846,470 B2
(45) Date of Patent: Nov. 24, 2020

(54) CALCULATING AND PRESENTING USER-SPECIFIC DIFFERENCES

(71) Applicant: Box, Inc., Redwood City, CA (US)

(72) Inventors: Matthew Andrew Nguyen, Redwood City, CA (US); Brian James Emerick, Mountain View, CA (US); Naeim Semsarilar, San Carlos, CA (US); Swaroop Butala, Fremont, CA (US); Kevin Tsoi, San Francisco, CA (US); Zachary Kelly, Redwood City, CA (US)

(73) Assignee: Box, Inc., Redwood City, CA (US)

( * ) Notice: Subject to any disclaimer, the term of this patent is extended or adjusted under 35 U.S.C. 154(b) by 250 days.

(21) Appl. No.: 15/957,411

(22) Filed: Apr. 19, 2018

(65) Prior Publication Data

US 2019/0325009 A1 Oct. 24, 2019

(51) Int. Cl.
*G06F 40/194* (2020.01)
*G06F 16/176* (2019.01)
*G06F 40/103* (2020.01)
*G06F 40/169* (2020.01)

(52) U.S. Cl.
CPC .......... *G06F 40/194* (2020.01); *G06F 16/176* (2019.01); *G06F 40/103* (2020.01); *G06F 40/169* (2020.01)

(58) Field of Classification Search
None
See application file for complete search history.

(56) References Cited

U.S. PATENT DOCUMENTS 6,596,030 B2 * 7/2003 Ball ............... G06F 16/957
 715/234
9,170,990 B2 * 10/2015 Von Weihe ............ G06F 40/14
(Continued)

OTHER PUBLICATIONS

Neil Fraser, "Diff, Match and Patch", www.github.com, URL:https://github.com/GerHobbelt/google-diff-match-patch, Jul. 15, 2015.
(Continued)

*Primary Examiner* — Uyen T Le
(74) *Attorney, Agent, or Firm* — Vista IP Law Group, LLP

(57) ABSTRACT

A multi-user collaboration system. User-specific change markings are applied to a collaboration object. The user-specific changes to be presented are time-oriented, based on a time of a last view of the collaboration object. A plurality of users that have access to the collaboration object are identified. Time-ordered versions of the collaboration object are captured. Each captured version corresponds to changes made to the collaboration object by any of the users. When a request to view the collaboration object is received from a subject user, a method determines the latest version of the collaboration object and also determines the specific last accessed version of the collaboration object that was seen by the subject user. The two versions are compared, and the comparison changes are used to generate user-specific change markings. The collaboration object with the generated user-specific change markings is presented by rendering the user-specific change markings on respective user-specific devices.

20 Claims, 15 Drawing Sheets

(56) References Cited

U.S. PATENT DOCUMENTS

| | | | | |
|---|---|---|---|---|
| 2013/0218829 A1* | 8/2013 | Martinez | ............ | G06F 21/6272 |
| | | | | 707/608 |
| 2014/0207730 A1* | 7/2014 | Spataro | ................... | G06F 16/93 |
| | | | | 707/608 |
| 2014/0282826 A1* | 9/2014 | Bastide | ................... | G06F 40/18 |
| | | | | 726/1 |
| 2015/0379294 A1* | 12/2015 | Cohen | ................... | H04L 65/403 |
| | | | | 726/28 |

OTHER PUBLICATIONS

Michael Bethencourt, "NW.js and Electron.js: Web Technology on the Desktop", URL: http://www.tivix.com/blog/nwjs-and-electronjs-web-technology-desktop/, May 13, 2015.

"Operational transformation", Wikipedia, the free encyclopedia, URL:https://en.wikipedia.org/wiki/Operational_transformation, Jul. 29, 2016.

* cited by examiner

600

Last View Table 602

| Object | User ID | Last Version Opened |
|---|---|---|
| Doc1 | User$_A$ | v81 |
| Doc1 | User$_B$ | v93 |
| Doc1 | User$_Z$ | v100 |
| Doc2 | User$_A$ | v2 |
| Doc2 | User$_B$ | v2 |

Most Current Version Table 604

| Object | Version ID |
|---|---|
| Doc1 | v101 |
| Doc2 | v3 |
| Doc9 | v22 |

FIG. 6

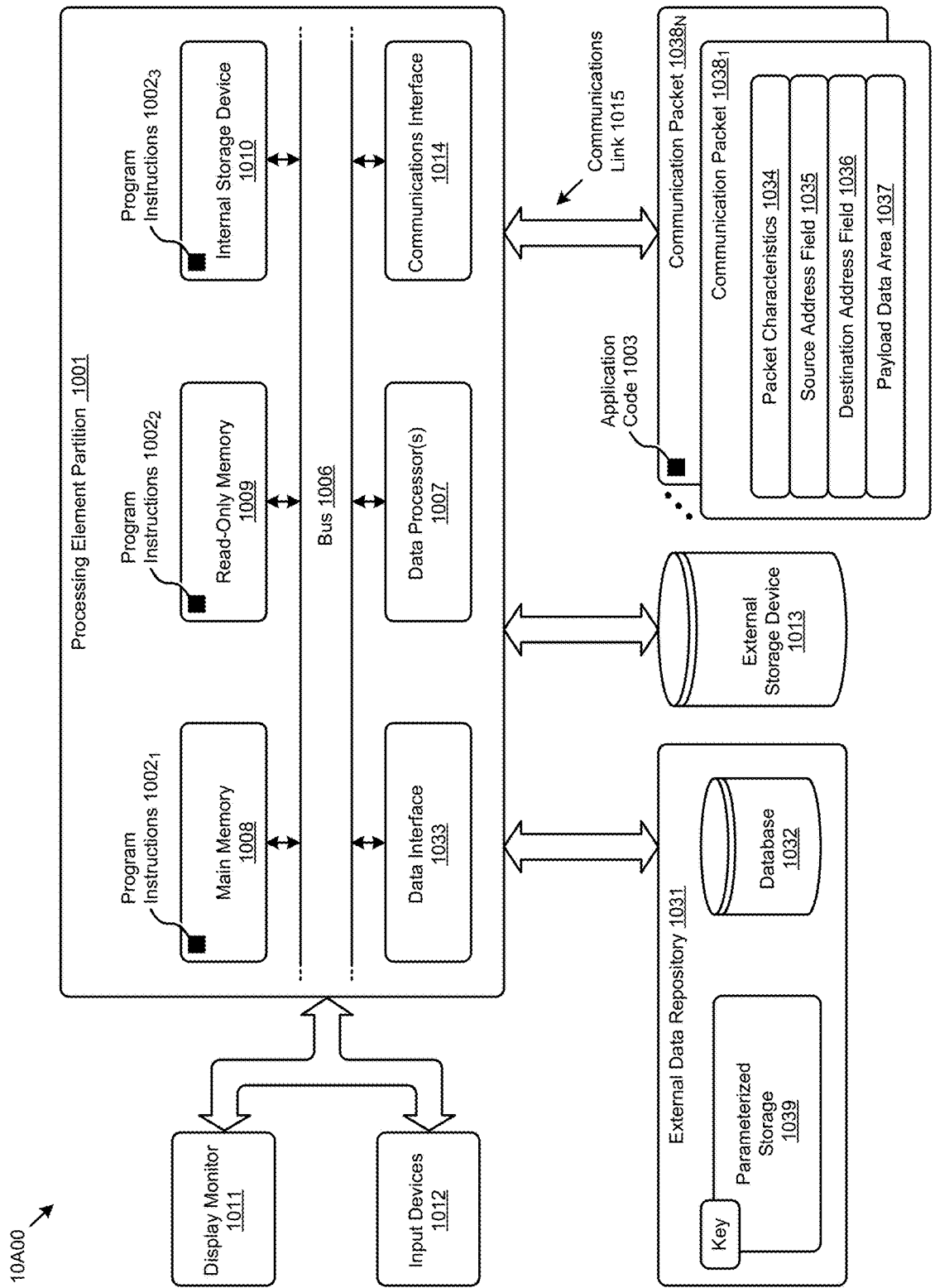

CALCULATING AND PRESENTING USER-SPECIFIC DIFFERENCES

FIELD

This disclosure relates to collaboration systems, and more particularly to techniques for calculating and presenting user-specific differences.

BACKGROUND

In modern collaboration systems, many users collaborate (e.g., read, edit, comment) over shared documents. A particular document might undergo any number of review, change, release, review change, and release cycles by any number of users. During the course of review of a document, a user can examine the most recent changes to the shared document by reviewing a "redline version" that highlights the most recent changes made to the document. Such a redline version can be generated at any moment in time by comparing the then-current version to the just previous version and highlighting (e.g., "redlining") the changes. This process can roll forward continuously as more changes are made, and successive redline versions can be generated comparing the newer latest version to the just previous version and highlighting (e.g., "redlining") the changes. In many collaboration environments, a particular user might want to see a "redlined" or "marked-up" version that highlights changes since the last version or view that that particular user had seen rather than seeing merely the changes in the last revision cycle.

Unfortunately, calculating and presenting document changes (e.g., in a redline document) that highlights text and formatting changes since the last version or view that that particular user had seen demands new methods. Therefore, what is needed is a way to determine and present user-specific renderings of a document.

SUMMARY

The present disclosure describes techniques used in systems, methods, and in computer program products for calculating and presenting user-specific differences between versions of a collaboration object, which techniques advance the relevant technologies to address technological issues with legacy approaches. More specifically, the present disclosure describes techniques used in systems, methods, and in computer program products for presenting user-specific revision markings when rendering a shared collaboration object in a multi-user environment. Certain embodiments are directed to technological solutions for maintaining a history of user-specific versions or views of a collaboration object so as to calculate user-specific changes relative to the last view that that specific user had seen.

The disclosed embodiments modify and improve over legacy approaches. In particular, the herein-disclosed techniques provide technical solutions that address the technical problems attendant to generating and displaying a set of collaboration object changes that are relative to a particular user's history of views. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of human-machine interfaces as well as advances in various technical fields related to computer document markup languages.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 6 depicts collaboration object version management data structures as used in systems for presenting user-specific revision markings when rendering a shared collaboration object in a multi-user environment, according to an embodiment.

FIG. 10A and FIG. 10B present block diagrams of computer system architectures having components suitable for implementing embodiments of the present disclosure, and/or for use in the herein-described environments.

DETAILED DESCRIPTION

Figure 1:
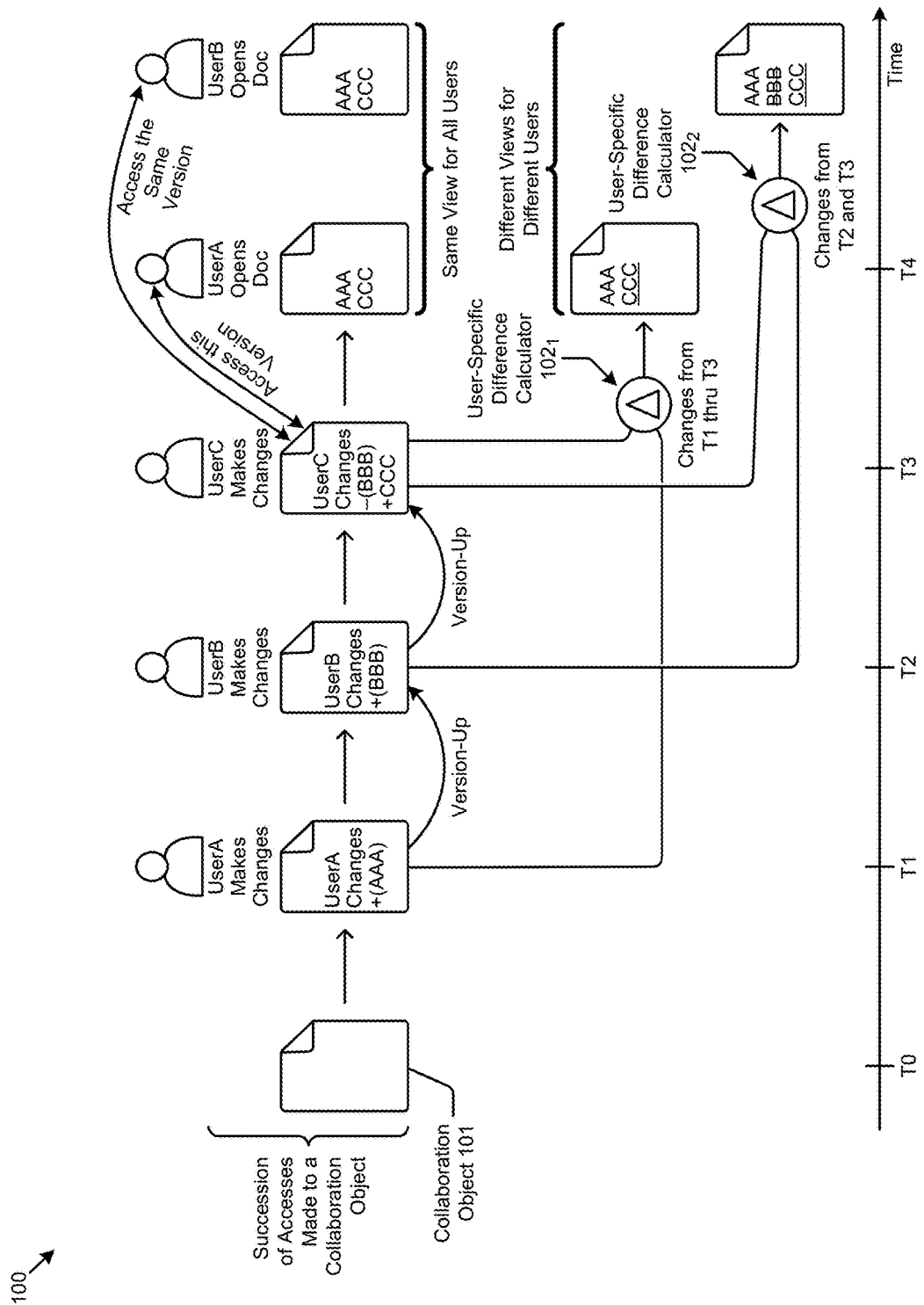
FIG. 1 depicts a multi-user document collaboration flow as used in an environment for presenting user-specific revision markings in a multi-user collaboration environment, according to an embodiment.

Embodiments in accordance with the present disclosure address the problem of generating and displaying a set of collaboration object changes that are relative to a particular user's history of views. Some embodiments are directed to approaches for maintaining a history of user-views of a collaboration object so as to calculate user-specific changes relative to the specific user's last view. The accompanying figures and discussions herein present example environments, systems, methods, and computer program products for presenting user-specific revision markings when rendering a shared collaboration object in a multi-user environment.

Overview

Disclosed herein are techniques for capturing a user's collaboration object view history (e.g., document view history) such that a user-specific comparison document can be presented to the particular user whenever demanded. The technique includes capturing a user- and document-specific history for all collaborators over a particular document. The revision markings that are presented in a particular document view that is rendered for a particular user include all changes made to the document by any of the collaborators since the last time the particular user last accessed the document. The user does not need to manage the visibility of changes in order to see just the changes made in the document by any of the collaborators since the last time that that particular user had last accessed the document.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

When determining how to render a view for a particular user that includes only the changes made to the collaboration object by collaborators since an earlier time when the particular user had accessed the collaboration object, a copy of the version of the collaboration object as of the earlier time is compared to the version of the collaboration object as of the time of the request. Comparisons are performed and changes are annotated such that just the changes made to the collaboration object after the last view by the particular user are displayed. Such changes are presented upon request and the user does not need to manage any aspects of timing and/or visibility of those changes in order to see just the changes that had happened since that user's last view. When making determinations as to the specific changes made to the collaboration object by collaborators since an earlier time when a particular user had accessed the collaboration object, techniques such as those disclosed herein are employed to determine which version of a document a user last saw. That version is used for determination of a set of content and style differences, after which determination each specific comparison difference is stylized so as to present a user-specific rendering of the document with user-specific revision markings (e.g., different colors, different styles, etc.).

Such determinations of content and style differences can be integrated into a collaboration system such that any number of changes made by any number of collaborators/users can be managed. Each different collaborator/user sees his or her own particular set of content and style changes that have been made since the last time the particular collaborator/user had accessed the collaboration object.

FIG. 1 depicts a multi-user document collaboration flow 100 as used in an environment for presenting user-specific revision markings in a multi-user collaboration environment. As an option, one or more variations of multi-user document collaboration flow 100 or any aspect thereof may be implemented in the context of the architecture and functionality of the embodiments described herein. The multi-user document collaboration flow 100 or any aspect thereof may be implemented in any environment.

FIG. 1 illustrates one aspect pertaining to maintaining a history of user-views of a collaboration object 101 so as to calculate user-specific changes relative to the specific user's last view. Specifically, the figure is being presented with respect to its contribution to addressing the problem of displaying a set of collaboration object changes that are relative to the version that is determined to be that specific user's last access to the document, rather than being relative to any other version. As shown, after operation of the user-specific difference calculator (e.g., user-specific difference calculator $102_1$ or user-specific difference calculator $102_2$), each user sees his or her own set of changes as depicted by the shown "different views for each user", rather than seeing an amalgamation of all changes that have been applied to the document over time as depicted by the shown "same view for all users". In this embodiment, the presentation of the deletion (deletion of "BBB") is depicted in strikethrough characters. However, in other embodiments, deleted text might be presented in a different style (e.g., with a coloring or shading, etc.), or might not appear at all (e.g., in the case that it had been deleted and remained deleted).

The embodiment shown in FIG. 1 is merely one example. As shown, the multi-user document collaboration flow spans a time period from time=T0 through to time=T4 and later. The foregoing depiction and discussion of FIG. 1 includes occurrences of the user-specific difference calculators (e.g., user-specific difference calculator $102_1$, user-specific difference calculator $102_2$). The user-specific difference calculators can be used to determine a set of changes made by collaborators by comparing two versions of a collaboration object. As shown, the determination of which versions to compare and how to display the changes to a particular user can be made by considering what content (e.g., version of a collaboration object) was last seen by a particular user. Several techniques for making determinations as to which changes to display to a particular user, and how to stylize such user-specific changes are discussed below.

The multi-user document collaboration flow 100 of FIG. 1 includes a depiction of results of version-up actions that occur when a user performs a save of a collaboration object. As shown, at a time between just after time=T1 and a time just before time=T2, the $user_A$ saves his or her changes. At a later time, for example, when time reaches time=T2 or after, $user_B$ accesses the versioned-up contents of the collaboration object. This processes of versioning-up can continue for any number of saves by any number of collaborators. At one or more later points in time, say time=T4, a first user might request to view the collaboration object again, and at time=T4+delta a second user might also request to view the collaboration object again. Comparison actions are taken to render user-specific differences such that $user_A$ sees differences between the contents of the latest version of the collaboration object (e.g., as of time=T4) as compared with contents of the collaboration object as of the last seen version by that $user_A$ (e.g., the version having contents of the collaboration object as of time=T1). Similarly, comparison actions are taken to render user-specific differences such that $user_B$ sees differences between the contents of the latest version of the collaboration object (e.g., as of time=T4) as compared with contents of the collaboration object as of the last seen version by that $user_B$ (e.g., the version having contents of the collaboration object as of time=T2). This can occur even though both $user_A$ and $user_B$ are both requesting to view the contents of the same version of the collaboration object (e.g., the same version of the collaboration object as of time=T4). As such, even though both $user_A$ and $user_B$ are both requesting to view the contents of the same version of the collaboration object, nonetheless they see different markup indications that highlight differences as compared to the last seen versions corresponding to $user_A$ and $user_B$, respectively.

The contents of the latest version of the collaboration object (e.g., as of time=T4) might be held in an in-memory area and might comprise changes that are not yet saved to persistent storage. In some cases, the contents of a particular version of the collaboration object (e.g., as of time=T3, or as of time=T4) might be stored to a non-volatile storage device. The determination as to whether to hold the collaboration object as of the particular version an in-memory area or whether to save the collaboration object as of the particular version in a non-volatile storage area can be made based on characteristics of an editing change event and/or a document save event, and/or expiration of a timer.

At the same or later time (e.g., later than time=T4), $user_B$ sees differences between the contents of the latest version of the collaboration object (e.g., as of time=T4) as compared with contents of the collaboration object as of the last seen version by $user_B$ (e.g., the version having contents of the collaboration object as of time=T2).

After accomplishing the aforementioned comparison actions, the user-specific differences can then be rendered on different display devices of respective different users. In many cases, the rendered differences comprise character-oriented content changes. In some cases, the differences often comprise style-oriented revision markings. In some cases, the differences comprise both character-oriented revision markings in combination with style-oriented revision markings. Using the foregoing comparison technique, rendering any of these types of revision markings in any combination can result in different views for different users.

The foregoing technique addresses issues present in prior attempts to render user changes that arise from multiple user accesses to a document. Specifically, prior attempts merely capture changes on top of changes on top of changes as a document is edited by successive users and/or editing sessions. Furthermore, prior approaches have failed to identify which content of which versions of a document had been last viewed by a user, and thus, are unable to be able to make a comparison (e.g., to calculate differences) between a latest version of a document and a particular earlier version that had been seen by a particular user. As a result, while some prior approaches present renderings of changes that are highlighted by author (e.g., by using a different color per each author), the prior approaches are unable to highlight the specific sets of changes that have occurred since a last version had been seen by a particular user. Highlighting controls that might be present in some prior approaches to facilitate user selection of colors and/or other stylizing of changes that can be changed and/or turned on or off under user control are nevertheless unable to highlight the specific set of changes that have occurred since a last version had been seen by a particular user.

For many reasons, including reasons of human cognition, users want to view and focus on only document changes that have occurred since the last time a particular document had been seen by that particular user. As such, by default, users want to be able to see only document changes that have occurred since the last time a particular document had been seen by a particular user without the user having to indicate any particular configuration or highlighting controls or settings in advance of viewing the user-specific changes. Still further, users want to be able to see only document changes that have occurred since the last time a particular document had been seen by a particular user without the user having to perform any manual selection of any versions of any documents other than the document to be viewed.

Figure 2:
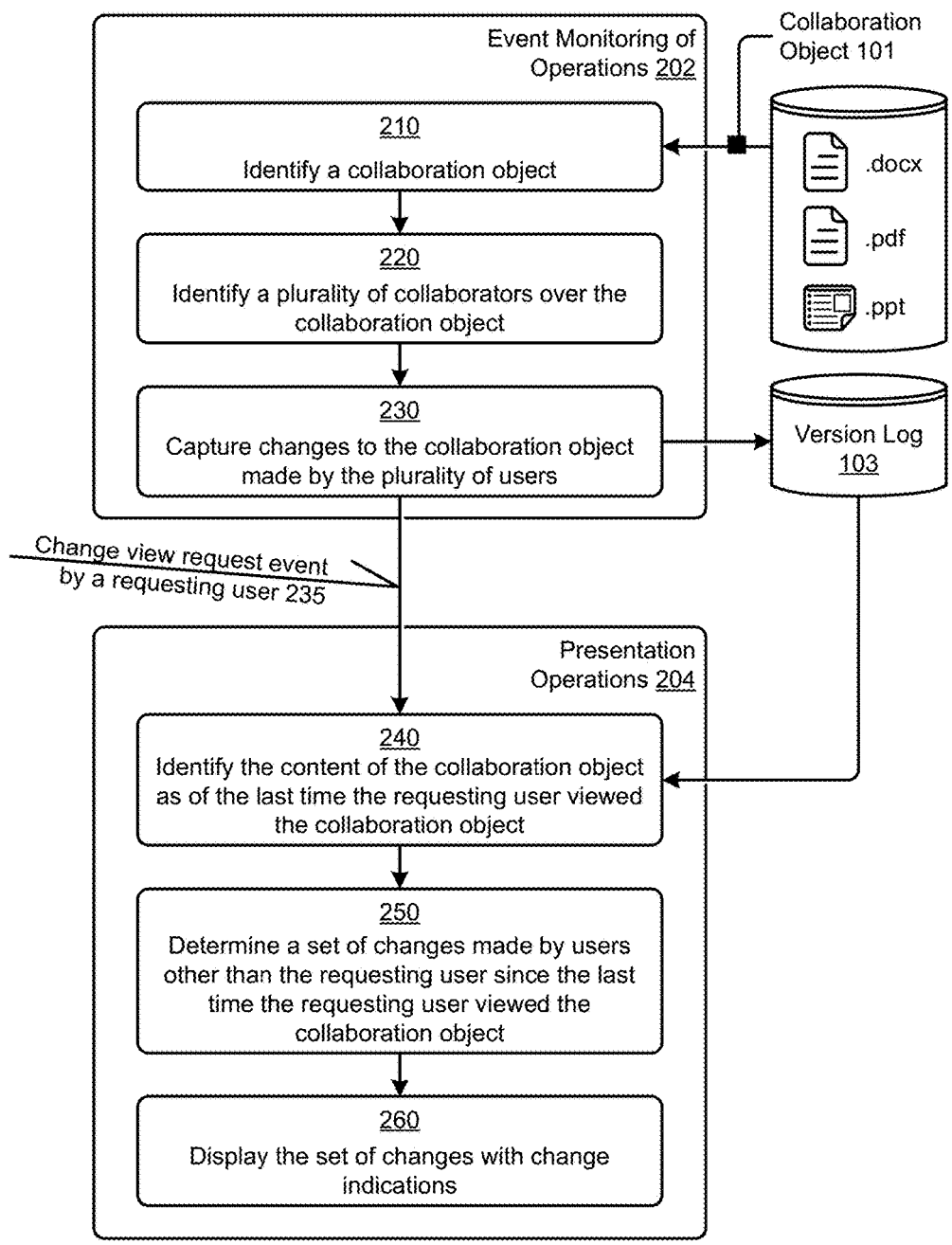
FIG. 2 presents an example flow of collaboration object processing for determining and displaying user-specific revision markings as used in a multi-user collaboration object sharing system, according to an embodiment.

FIG. 2 presents an example flow of collaboration object processing 200 for determining and displaying user-specific revision markings as used in a multi-user collaboration object sharing system. As an option, one or more variations of collaboration object processing 200 or any aspect thereof may be implemented in the context of the architecture and functionality of the embodiments described herein. The collaboration object processing 200 or any aspect thereof may be implemented in any environment.

FIG. 2 illustrates one aspect pertaining to maintaining a history of user-views of a collaboration object so as to calculate user-specific changes relative to the specific user's last view. Specifically, the figure is being presented with respect to its contribution to addressing the problem of generating and displaying a set of collaboration object changes that are relative to a particular user's history of views.

During the course of collaboration among multiple collaborators, any number of changes to a collaboration object might be made by any number of collaborators. Often a collaborator will make changes or edits "on top of" changes made by a previous collaborator. During the course of ongoing editing, a particular collaborator might want to see which changes had been made to the collaboration object since the last time that that particular collaborator had seen the collaboration object. To do so, the version of the collaboration object as of the last time that a particular collaborator had seen it would need to be identified. As such, FIG. 2 illustrates one technique for identifying the version of the collaboration object as of the last time a particular collaborator had seen it. As shown, event monitoring operations 202 serve to capture ongoing changes over a particular collaboration document.

The shown flow commences at step 210 upon some determination or identification of a particular collaboration object. At step 220 a set of collaborators over that particular collaboration object is determined. In the underlying collaboration system, access events (e.g., open, close edit, etc.) over shared collaboration documents are captured (at step 230) such that any access or change event over the particular collaboration object can be captured, classified (e.g., into an access type classification), and stored (e.g., in an in-memory data structure or database). The event monitoring operations 202 are carried out continuously by the underlying collaboration system. As collaborators are added to a particular collaboration object, the data collection is configured to capture accesses or change events over the particular collaboration object that are made by the newly added collaborators. Any of such changes can cause emission of a log entry. Specifically, a change or set of changes made over a certain time period (e.g., 30 seconds) can precipitate a log entry that correlates a particular action by a particular user that results in a particular version of the collaboration object. Log entries are made to a version log 103, which version log can be stored using any known technique. Such a version log is made available to other operations, such as are depicted hereunder.

At any moment in time, a user might want to view a then-current version of a collaboration object. More specifically, at any moment in time, a particular user might want to view a then-current version of a collaboration object that has revision markings that show which changes have been made to the collaboration object since the last time the particular user last accessed the document. To do so, the particular user might issue a change view request, which change view request raises a change view request event by a requesting user 235.

Occurrence of such a change view request event by a requesting user 235 causes a set of presentation operations 204 to be invoked. Specifically, at step 240, so as to be able to construct markup of the collaboration object such that the markup shows which changes have been made to the collaboration object since the last time the requesting user last accessed the document, a specific version of the collaboration object as of the last time the requesting user had accessed the collaboration object of interest is identified. To do so, any portions of the version log is accessed, and using the determined version (e.g., using a version number or other version identifier), the collaboration object as of the determined version is accessed. More specifically, the contents of the collaboration object as of the determined version are retrieved, and the retrieved content is used (by method 250) in combination with a then-current version of the collaboration object to determine a set of changes to display to the requesting user. Once such changes have been determined, the changes can be displayed (at step 260) to the requesting user on the requesting user's device. In some cases, the requesting user's device supports use of colors and/or shadings, and/or other highlighting to indicate which changes had been made by which users. In the example cases, underlining (e.g., for insertions) and strikethrough typefaces (e.g., for deletions) are used to indicate which changes had been made to the collaboration document since the last version or view that that particular user had seen.

The embodiment shown in FIG. 2 is merely one example of processing flows. Other processing flows can be used while still being able to indicate which changes had been made to the collaboration document since the last version or view that that particular user had seen. Also, many architectures or variations of computing systems, storage systems, client-server relationships, browsers, display devices, display clients etc. can be used. One such architecture is shown and described as pertains to the following figures.

Figure 3A:
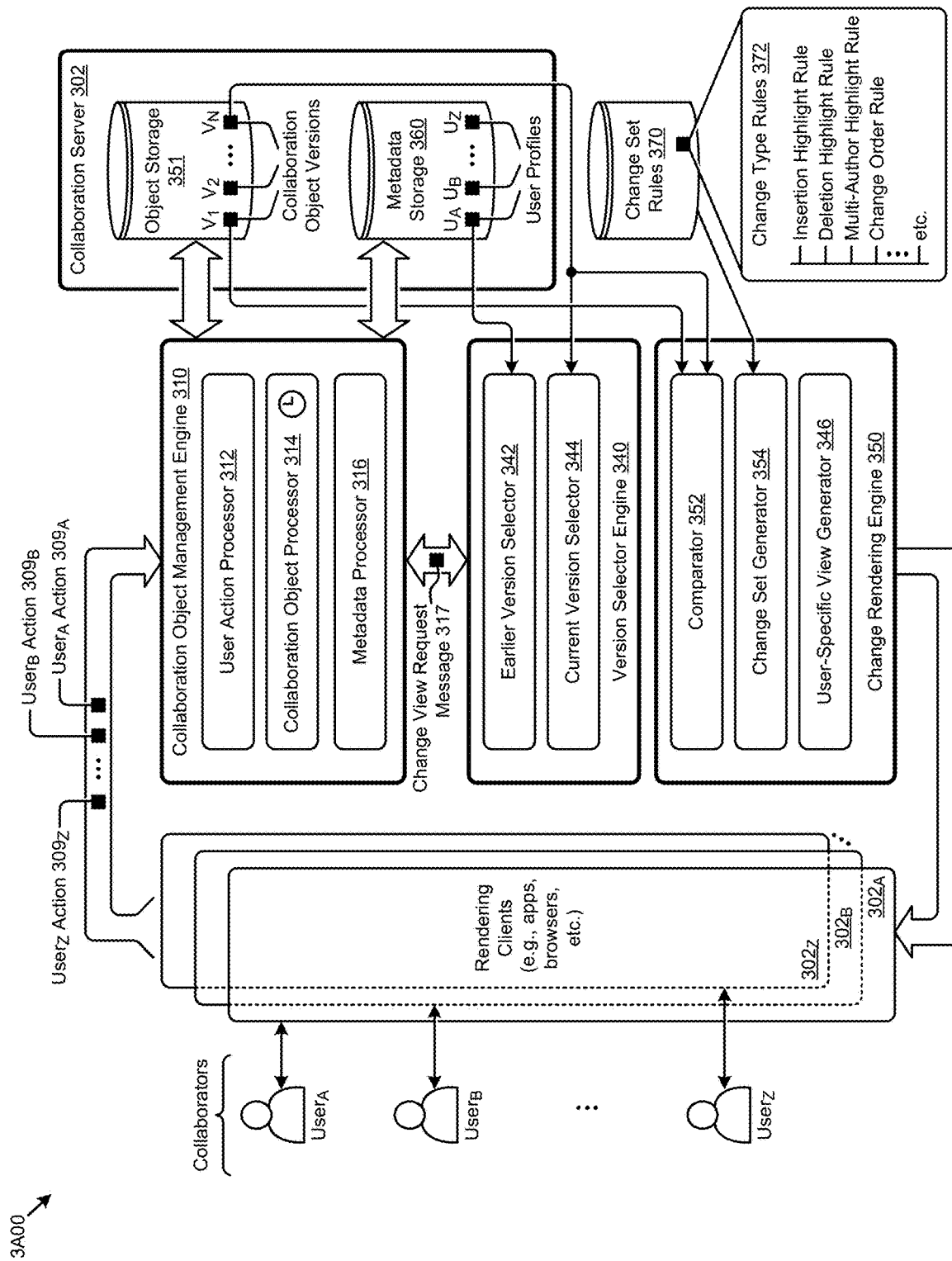
FIG. 3A presents a block diagram of a collaboration object processing system for determining and displaying user-specific revision markings as used in a multi-user collaboration environment, according to an embodiment.

FIG. 3A presents a block diagram of a collaboration object processing system 3A00 for determining and displaying user-specific revision markings as used in a multi-user collaboration environment. As an option, one or more variations of collaboration object processing system 3A00 or any aspect thereof may be implemented in the context of the architecture and functionality of the embodiments described herein. The collaboration object processing system 3A00 or any aspect thereof may be implemented in any environment.

FIG. 3A illustrates one aspect pertaining to maintaining a history of user-views of a collaboration object so as to calculate user-specific changes relative to the specific user's last view. Specifically, the shown collaboration object processing system includes a collaboration object management engine 310, a version selector engine 340, and a change rendering engine 350. Any or all of the foregoing engines are configured to interface with a collaboration server 302. Any of these engines can operate in parallel so as to process user actions (e.g., user$_A$ action 309$_A$, user$_B$ action 309$_B$, ..., user$_Z$ action 309$_Z$, etc.) as raised from collaboration activities by the collaborators (user$_A$, user$_B$, ..., user$_Z$) as they interact with their respective rendering clients (e.g., $user_A$ rendering client $302_A$, $user_B$ rendering client $302_B$, ..., $user_Z$ rendering client $302_Z$, etc.).

Specifically, when the collaboration object management engine 310 receives a user action such as $user_A$ action $309_A$, $user_B$ action $309_B$, ..., $user_Z$ action $309_Z$, etc. a user action processor 312 is invoked to determine characteristics of the user and the type of action. Also, a collaboration object processor 314 is invoked to determine characteristics of the collaboration object. As such, object storage 351 serves to store any number of versions of the collaboration object. Each of such versions might correspond to a version number ($V_1$, $V_2$, ..., $V_N$, etc.) or other version or sequence indication. Moreover, each of such versions might correspond to an event that pertains to a particular user. For example, a metadata storage 360 might store relationships between users, their corresponding actions, and versions of a collaboration document that are affected by the various specific user's corresponding actions. The metadata storage 360 might also store user profiles (e.g., user profile $U_A$, user profile $U_B$, ..., user profile $U_Z$, etc.), which in turn might carry information pertaining to user preferences. The metadata processor 316 of collaboration object management engine 310 can perform any or all of the foregoing metadata operations. In some cases, metadata processor 316 relies in part on results from and/or communication with the collaboration object processor 314 and/or the user action processor 312.

The collaboration object management engine 310 carries out its assigned functions continuously, and in parallel with the functions of the version selector engine 340 and the change rendering engine 350. At any moment in time a user might raise a change view request event by a requesting user, which in turn, possibly through operation of a rendering client and/or possibly through operation of collaboration object management engine 310, formats and sends a change view request message 317. As earlier indicated, collaboration object processing system 3A00 maintains a history of user-views of a collaboration object so as to calculate user-specific changes relative to the specific user's last view. Thus, when a particular user raises a change view request event, a corresponding change view request message 317 is sent by the collaboration object processing system to the version selector engine 340.

The version selector engine relies on the shown earlier version selector 342 and the shown current version selector 344 to identify two versions of the same collaboration object to be compared. In this example, the earlier version is the version corresponding to $V_1$, and the current version is the version corresponding to $V_N$. Once the two versions to be compared have been identified, then the change rendering engine 350 is invoked so as to compare the two versions (e.g., using the comparator 352). In some embodiments content of the current version comprises only the then-current "changes accepted" version of the content. In other embodiments, content of the current version is constructed by superimposing all intervening saves by any of the collaborators such that the current version comprises representations of each and every change, together with a corresponding user (e.g., userID), change and/or save sequence information (e.g., timestamp of the change or save), and a characterization of the change itself (e.g., insert, delete, style change, etc.). In some embodiments, all or portions of the changes to a collaboration object are codified in a change language, such as the operational transformation (OT) protocol language.

Further details regarding general approaches to definitions and uses of change languages are described in U.S. application Ser. No. 15/421,296 titled "COLLABORATIVE CLOUD-BASED DOCUMENT EDITING FROM A BROWSER-ENABLED PLATFORM NATIVE APPLICATION", filed on Jan. 31, 2017, which is hereby incorporated by reference in its entirety.

Returning to the discussion of change rendering engine 350, the shown change set generator 354 serves to determine how to deal with changes to the same portions of content of a collaboration document that had been made by different collaborators. For example, if a first collaborator added a word to a sentence, and subsequently a different collaborator deleted that word, the change set generator 354 determines if the added and then deleted word should appear in its sentence at all, or if the added and then deleted word should be shown using underlined characters, as well as using strikethrough characters.

Irrespective of stylistic variations that might be made, the change set generator 354 outputs a set of user-specific changes. Specifically, the user-specific changes output by the change set generator are based at least in part on the differences that are calculated based on collaborator changes relative to the specific user's last view of the subject collaboration document. The change set generator 354 applies user-specific annotations to the user-specific differences. As examples, and as shown, a set of change set rules 370 might be applied so as to comport with a particular user's preferences. Change set rules can be defined to be specific to a particular object type or class. As shown, a particular set of change type rules 372 might describe rules pertaining to stylizing insertions, and/or deletions, and/or might describe rules pertaining to stylizing occurrences of changes assembled from multiple collaborators, and/or might describe an order or precedence that is used when stylizing changes.

The results of the change set generator 354 are passed to the user-specific view generator 346. The user-specific view generator determines the nature of the particular user's rendering client (e.g., browser, browser plus web app, native client, etc.) and based at least in part on that determination, the changes are presented in corresponding format.

Strictly as one example, a change set might be represented as a sequence of operational transformation statements, and such a sequence of operational transformation statements might be translated into corresponding HTML. Further, during the course of translating operational transformation statements into corresponding HTML, the aforementioned change type rules 372 might be processed so as to comport with user-specified preferences.

The functions of the collaboration object management engine 310, the version selector engine 340, and the change rendering engine 350 can be wholly or partially implemented in a server, or wholly or partially implemented in a client. The different protocols that facilitate many possible implementation partitionings are given in the following FIG. 3B and FIG. 3C.

Figure 3B:
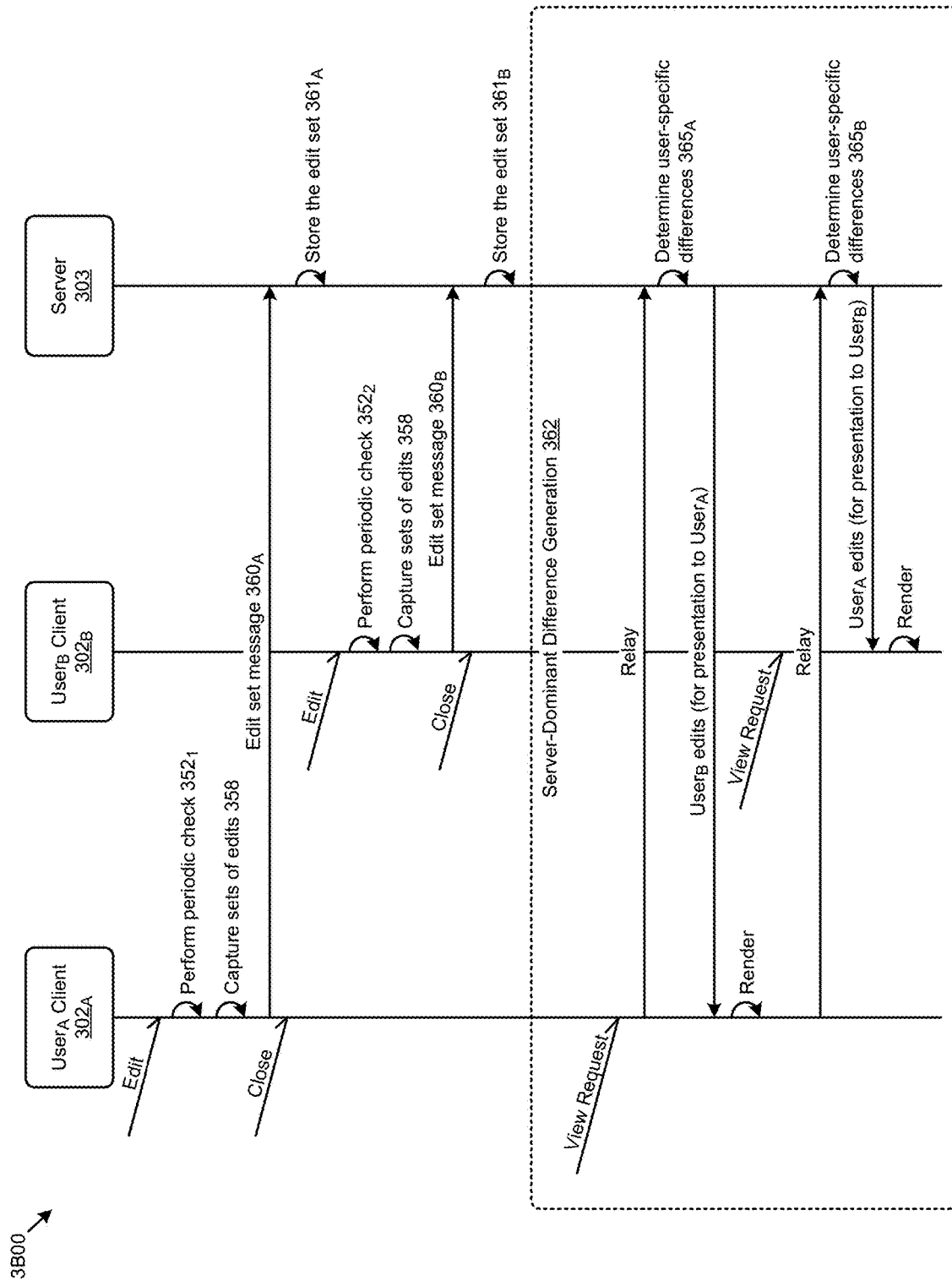
FIG. 3B depicts a server-dominant processing protocol for determining and displaying user-specific revision markings as used in a multi-user collaboration environment, according to an embodiment.

FIG. 3B depicts a server-dominant processing protocol 3B00 for determining and displaying user-specific revision markings as used in a multi-user collaboration environment. As an option, one or more variations of server-dominant processing protocol 3B00 or any aspect thereof may be implemented in the context of the architecture and functionality of the embodiments described herein. The server-dominant processing protocol 3B00 or any aspect thereof may be implemented in any environment.

As shown, the protocol operates between clients and a server. Over time, different collaborators edit a particular document. At a later time, after both of the shown editors have made their edits, each collaborator requests a view. The user-specific differences for each of $user_A$ and $user_B$ is calculated at the server. Each user-specific client, having received respective user-specific document with user-specific differences, initiates rendering of a user-specific view. More specifically, portions of the foregoing protocol are implemented on user clients (e.g., $user_A$ rendering client $302_A$ and $user_B$ rendering client $302_B$) and portions of the foregoing protocol are implemented at server 303. In this particular partitioning, the server-dominant difference generation involves calculation of user-specific differences at server 303.

As shown, prior to server calculation of differences, $user_A$ edits a document. An agent within the $user_A$ client performs a periodic check $352_1$ to capture sets of edits 358. Periodically, an edit set message $360_A$ pertaining to $user_A$'s edits are sent to the server. The server will store the edit set $361_A$, possibly as a set of operational transformational statements, or possibly as another codification of a "snapshot" document.

FIG. 3B illustrates one aspect pertaining to maintaining a history of user-views of a collaboration object so as to calculate user-specific changes relative to the specific user's last view. Specifically, the figure is being presented with respect to its contribution to addressing the problem of generating and displaying a set of collaboration object changes that are relative to a particular user's history of views. At some moment, $user_A$ might close the document, at which time $user_B$ may begin to edit the document. The $user_B$ client performs a periodic check $352_2$ to capture sets of edits 358. Periodically, an edit set message $360_B$ pertaining to $user_B$'s edits are sent to the server. The server will store the edit set $361_B$, possibly as a set of operational transformational statements, or possibly as another codification of a "snapshot" document.

A server-dominant difference generation 362 involves calculation of differences, which differences result from selection of different documents to compare. In this example, $user_A$ requests a view of the document, which request is relayed to server 303. The server in turn retrieves the version or snapshot that correspond to the last document that $user_A$ has seen. This document is compared to the then-current last version of the document. The server can then determine user-specific differences $365_A$ as pertains to the timing and nature of the $user_A$ view request. At a later moment, $user_B$ requests a view of the document, which request is relayed to the server 303. The server in turn retrieves the version or snapshot that correspond to the last document that $user_B$ has seen. This document is compared to the then-current last version of the document. The server can then determine user-specific differences $365_B$ as pertains to the timing and nature of the $user_B$ view request.

The embodiment shown in FIG. 3B is merely one example. As shown, the server 303 performs the difference calculations, however in another embodiment, the clients perform the difference calculations. Such an embodiment is shown and described as pertains to the client-dominant processing protocol of FIG. 3C.

Figure 3C:
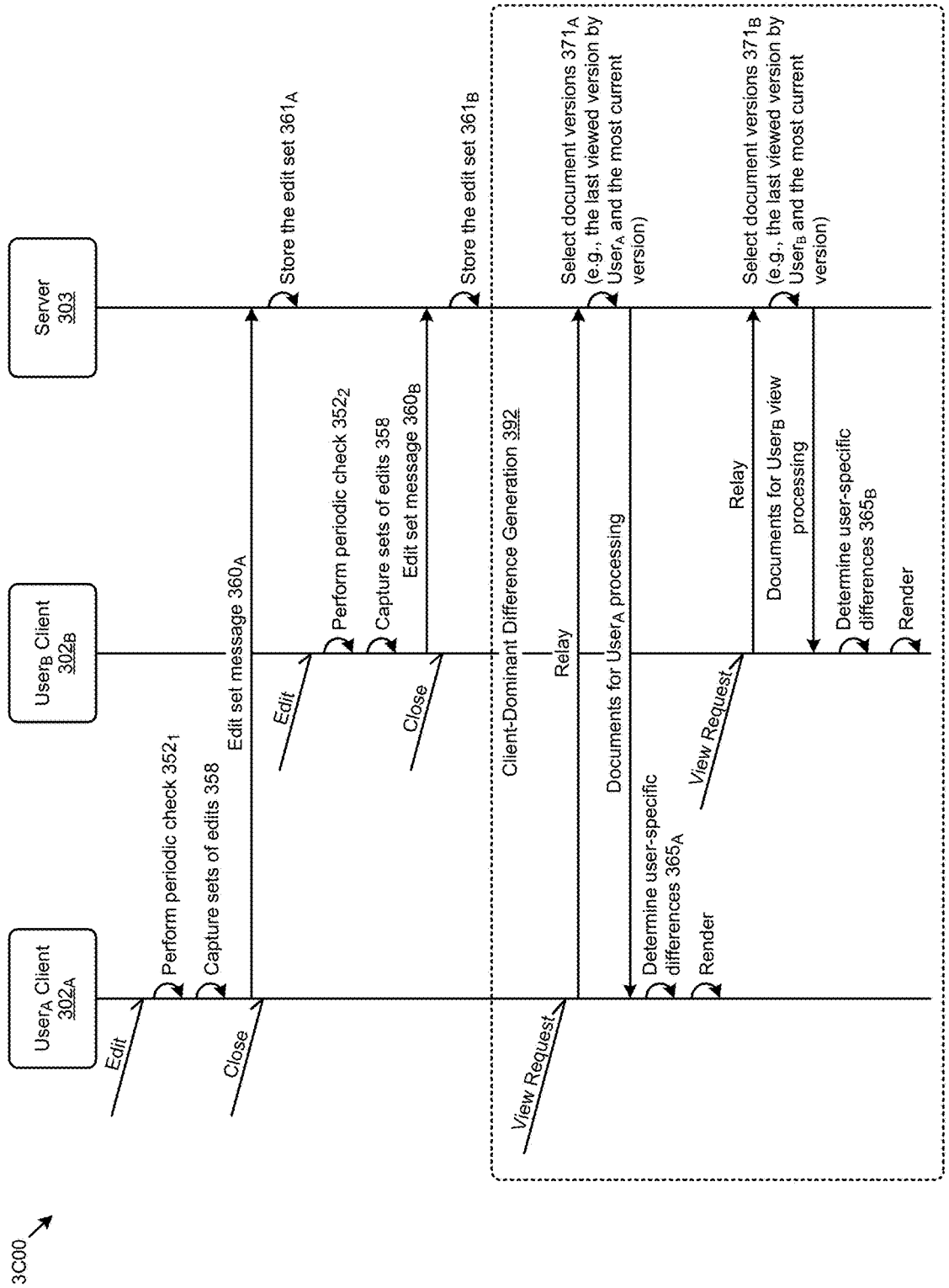
FIG. 3C depicts a client-dominant processing protocol for determining and displaying user-specific revision markings as used in a multi-user collaboration environment, according to an embodiment.

FIG. 3C depicts a client-dominant processing protocol 3C00 for determining and displaying user-specific revision markings as used in a multi-user collaboration environment. As an option, one or more variations of client-dominant processing protocol 3C00 or any aspect thereof may be implemented in the context of the architecture and functionality of the embodiments described herein. The client-dominant processing protocol 3C00 or any aspect thereof may be implemented in any environment.

FIG. 3C illustrates an embodiment where the server 303 performs determination and retrieval of documents to be compared and where the clients perform the difference calculations. This is shown in the area designated as client dominant difference generation 392. Specifically, upon a relay of a view request from $user_A$, at operation $371_A$, the server 303 selects two document versions. One document version is the version that was last seen by $user_A$, and the other document version is the then-current version of the subject document. Both of these documents are delivered to $user_A$ rendering client $302_A$. $User_A$ rendering client $302_A$ then performs calculations to determine user-specific differences $365_A$, after which $user_A$ rendering client $302_A$ renders the corresponding user-specific view.

Upon a view request from $user_B$, the $user_B$ request is relayed to the server 303, which, via performance of operation $371_B$, selects two document versions. One document version is the version that was last seen by $user_B$, and the other document is the then-current version of the subject document. Both of these documents are delivered to $user_B$ rendering client $302_B$. Users rendering client $302_B$ then performs calculations to determine user-specific differences $365_B$, after which $user_B$ rendering client $302_B$ renders the corresponding user-specific view.

Figure 4A:
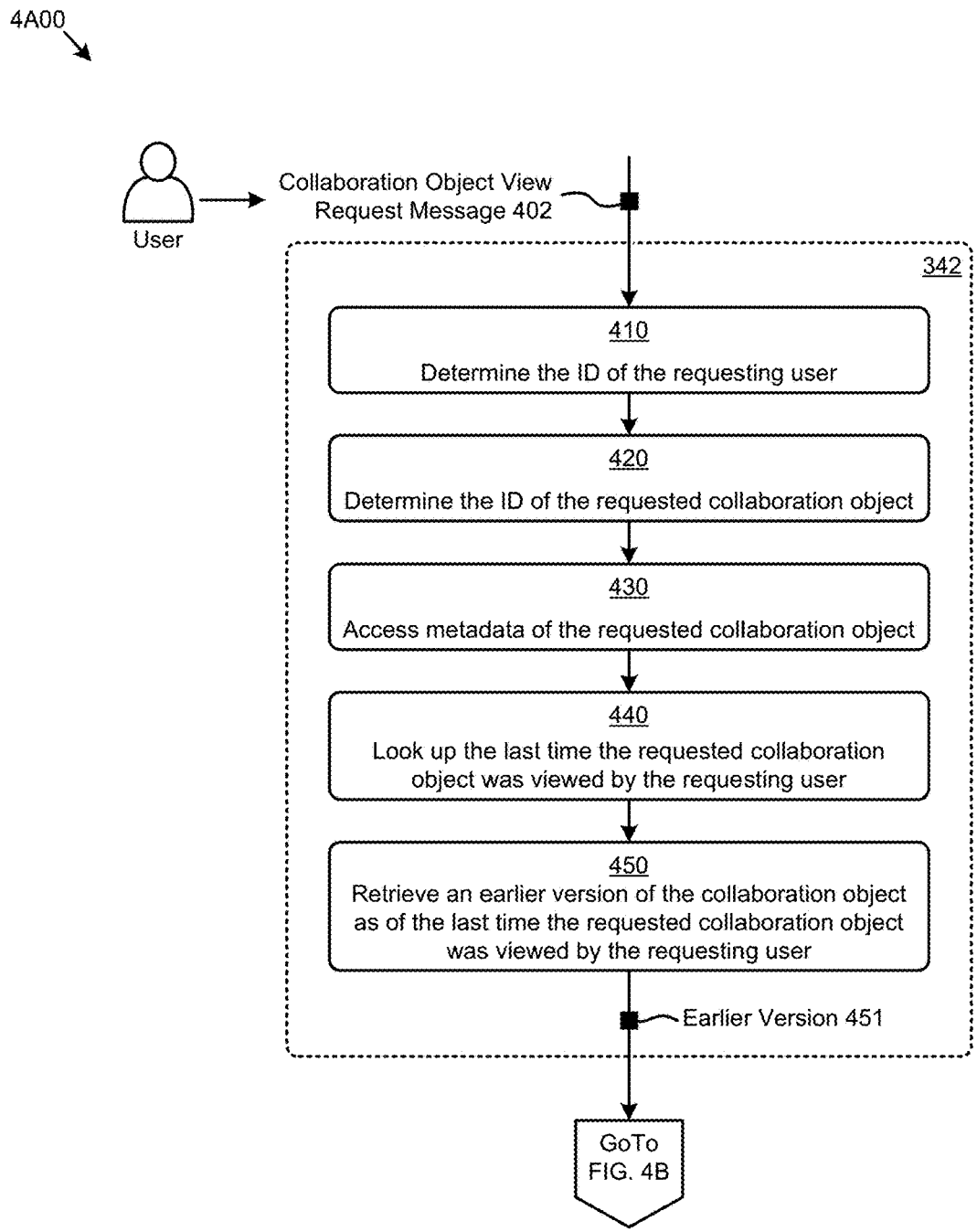
FIG. 4A exemplifies a last viewed collaboration object retrieval technique as used in systems for presenting user-specific revision markings when rendering a shared collaboration object in a multi-user environment, according to an embodiment.

FIG. 4A exemplifies a last viewed collaboration object retrieval technique 4A00 as used in systems for presenting user-specific revision markings when rendering a shared collaboration object in a multi-user environment. As an option, one or more variations of last viewed collaboration object retrieval technique 4A00 or any aspect thereof may be implemented in the context of the architecture and functionality of the embodiments described herein. The last viewed collaboration object retrieval technique 4A00 or any aspect thereof may be implemented in any environment.

The flow of FIG. 4A commences upon receipt of a collaboration object view request message 402 (e.g., possibly resulting from a change view request event by a requesting user 235). The versions of a collaboration object and/or the snapshots or other codification of successive changes are stored in object storage 351 (see FIG. 3A). Also, metadata storage 360 pertaining to users, user profiles, user preferences, etc. are available for access from the collaboration server. As such, upon receipt of a collaboration object view request message 402 from a particular user, at step 410, characteristics (e.g., user name, user role, unique identifier for the requesting user, etc.) are determined. Similarly, at step 420, an ID or key (e.g., for use in a database query) is determined such that the collaboration object and characteristics thereof can be accessed.

Specifically, and as shown at step 430, once an ID and/or key have been determined, additional characteristics such as access path, folder, filename, versions saved, then-current version ID, etc. of the collaboration object are retrieved from object storage 351 and/or from metadata storage 360. Based on the retrieved metadata, at step 440, the last time (e.g., by timestamp or sequence number or other version designation), that the requesting user has seen the document is determined, and then a corresponding earlier version 451 is retrieved from object storage 351 (at step 450). In some cases, the version of a document that corresponds to the timestamp or sequence number or other version designation is constructed by applying a sequence of snapshots or operational transformation statements to a base document, possibly generating a snapshot associated with a timestamp of an editing change event or set of editing changes. In other cases, the version of a document that corresponds to the timestamp or sequence number (or other version designation) can be persisted as a saved document that can be retrieved from object storage 351.

Figure 4B:
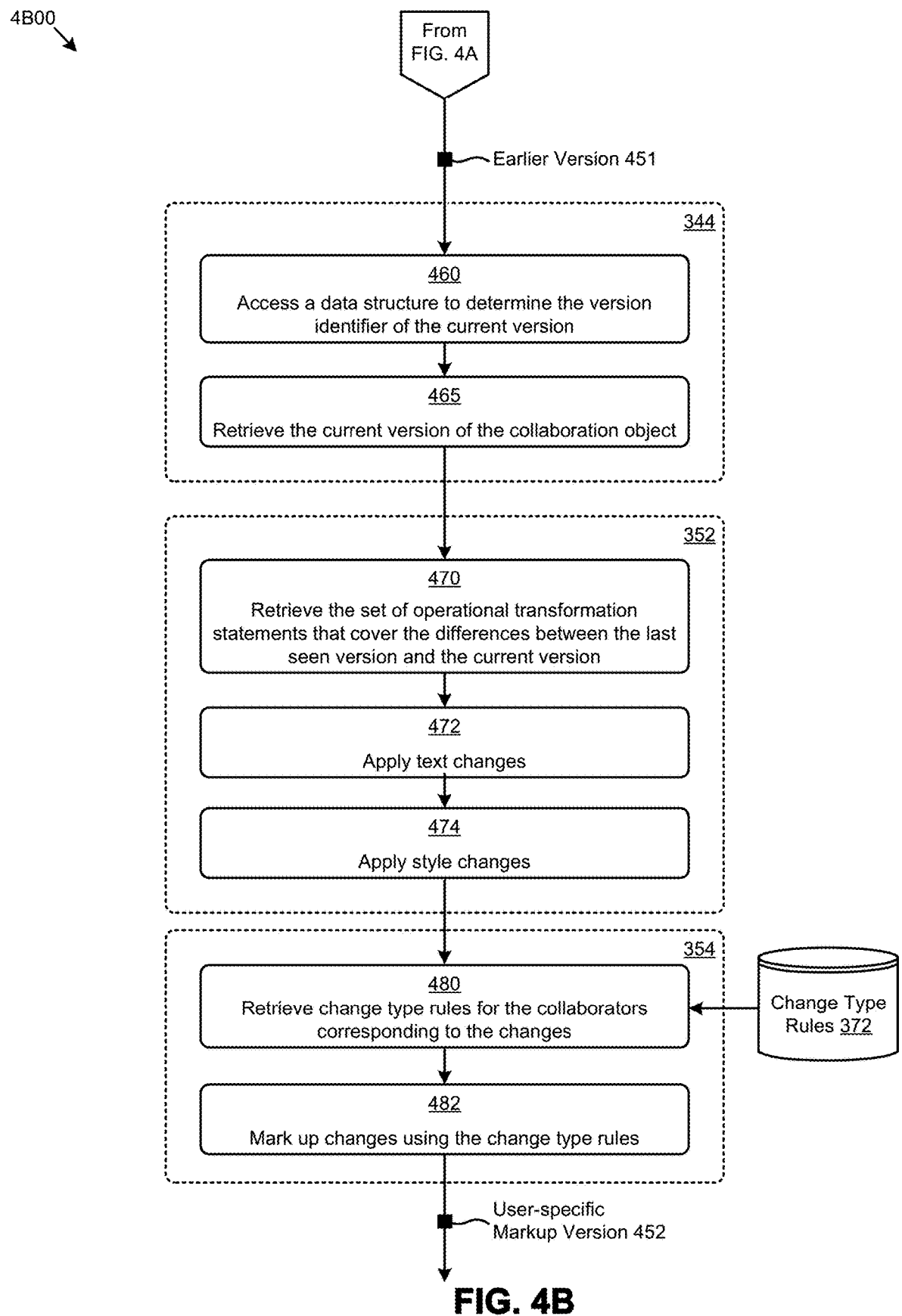
FIG. 4B exemplifies a collaboration object comparison technique as used in systems for presenting user-specific revision markings when rendering a shared collaboration object in a multi-user environment, according to an embodiment.

FIG. 4B exemplifies a collaboration object comparison technique 4B00 as used in systems for presenting user-specific revision markings when rendering a shared collaboration object in a multi-user environment. As an option, one or more variations of collaboration object comparison technique 4B00 or any aspect thereof may be implemented in the context of the architecture and functionality of the embodiments described herein. The collaboration object comparison technique 4B00 or any aspect thereof may be implemented in any environment.

FIG. 4B illustrates one aspect pertaining to maintaining a history of user-views of a collaboration object so as to calculate user-specific changes relative to the specific user's last view. Specifically, the figure is being presented so as to depict how to compare two versions such that the changes that result from the comparison are user-specific changes relative to the specific user's last view. To accomplish this, the flow of FIG. 4B accepts an input in the form of an indication of the previously determined earlier version. Using any of the identification and/or retrieval techniques of FIG. 4A, at step 460, the then-current version of the subject collaboration object is identified. As shown, a data structure is accessed, which data structure has a correlation between a particular collaboration object and its version identifier. At step 465, the identified version is retrieved. Then, beginning at step 470, those two versions are compared, resulting in a set of user-specific changes—specifically changes that are relative to the specific user's last view. In some embodiments, and as shown, operational transformation statements are used to identify changes. Step 470 serves to retrieve the set of operational transformation statements that had been applied during the time period between the time of the specific user's last view and the time of the last saved version. Such operational transformation statements can carry information pertaining to textual changes, and/or style changes and/or other changes to a collaboration object. In the embodiment of FIG. 4B, step 472 serves to apply text changes and step 474 serves to apply style changes. In many cases, the technique of applying successive operational transformation statements to an earlier document to generate a later document is much faster than comparing the two objects to derive changes. For example, consider a very large document that has only a few changes. In such a situation, the technique of applying just the few operational transformation statements is much faster than comparing the two large objects.

Step 480 and step 482 combine to apply markings to the resulting set of user-specific changes such that when rendered on a user device, the markup/highlighting of changes (e.g., insertions, deletions, etc.) that are relative to the specific user's last view comport with the applied rules for markup/highlighting (e.g., in accordance with the change type rules 372). As shown, step 480 accesses change type rules 372 to retrieve the specific set of markup rules that correspond to the collaborators who raised changes. Then, at step 482, markup is applied using the specific set of markup rules that correspond to the collaborators who raised changes. Performance of step 480 and step 482 results in a user-specific markup version 452.

Figure 5A:
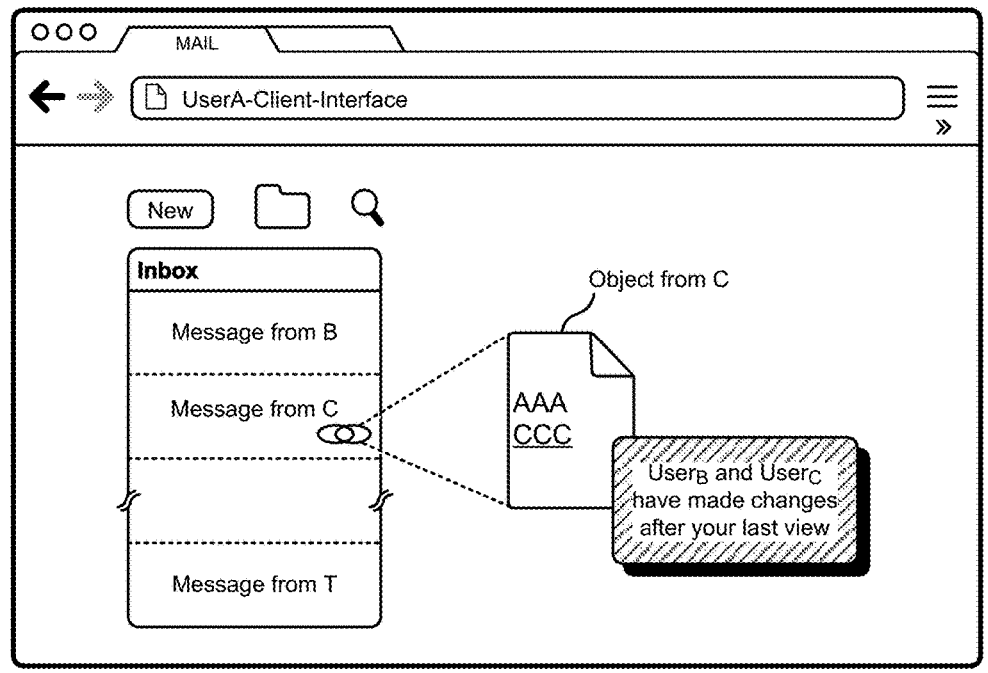
FIG. 5A depicts a collaboration object change display technique pertaining to a first user as used in systems for presenting user-specific revision markings when rendering a shared collaboration object in a multi-user environment, according to an embodiment.
Figure 5B:
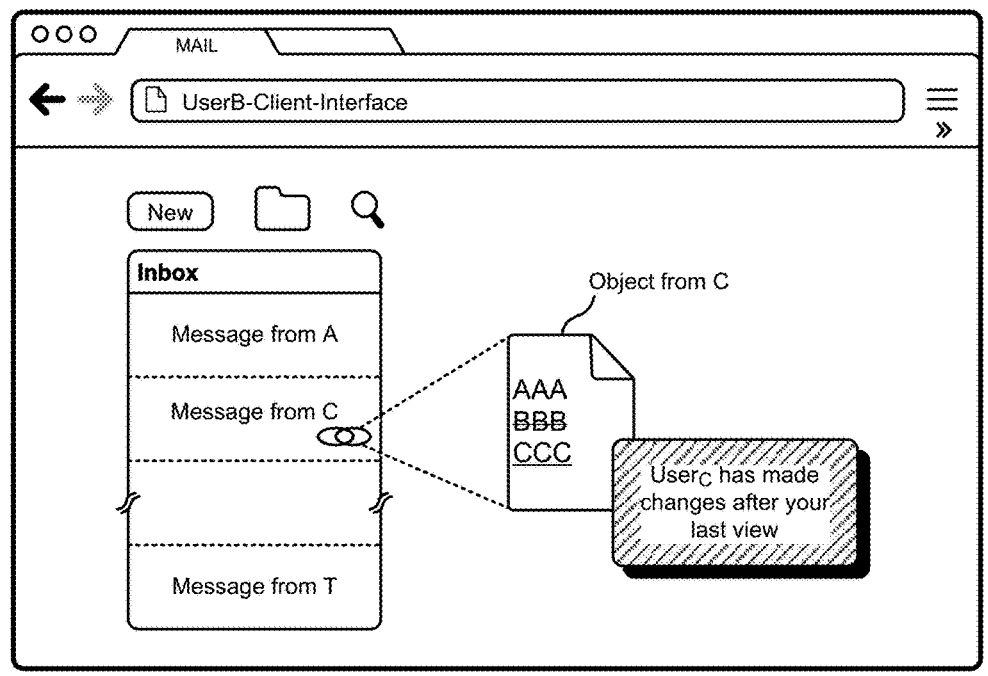
FIG. 5B depicts a collaboration object change display technique pertaining to a second user as used in systems for presenting user-specific revision markings when rendering a shared collaboration object in a multi-user environment, according to an embodiment.

FIG. 5A depicts a collaboration object change display technique pertaining to a first user as used in systems for presenting user-specific revision markings when rendering a shared collaboration object in a multi-user environment, whereas FIG. 5B depicts a collaboration object change display technique pertaining to a second user in systems for presenting user-specific revision markings when rendering a shared collaboration object in a multi-user environment. The figures are presented for comparison to each other. Specifically, even though both the first user of FIG. 5A and the second user of FIG. 5B are interacting with the same "Object from C", the views are different. Specifically, whereas in FIG. 5A $user_A$ sees a compilation of changes made by $user_B$ and $user_C$, in FIG. 5B, $user_B$ sees only the compilation of changes made by $user_C$. This is because the versions of the collaboration document as were last accessed by $user_A$ and $user_B$ are different versions.

In some embodiments, when there are multiple changes from multiple users, each change might be highlighted differently (e.g., using different styles or colors of highlighted characters) based on the different user. Use of the aforementioned color palette is merely one technique to distinguish between authors. Other techniques for highlighting (e.g., shading, shadowing, boxing, etc.) can be used singly or in combination.

In some situations, two or more users might be editing the same document at the same time. In such situations, author-specific highlighting can be suppressed so as to reduce screen "busyness". Instead, rather than display changes by different authors in different styles, the changed text is display without author-specific styling. In some situations, a particular user might deem the author-specific highlighting to be desirable, in which case that particular user can select that that particular user's own presentation does include author-specific stylization of text changes.

The shown characteristics of a web page and the depiction of the "Inbox" and icons are merely for illustration. Any technique for opening a shared collaboration object such as "Object from C" can be used without departing from the disclosed technique of presenting different views for each user based on the last seen version.

FIG. 6 depicts collaboration object version management data structures 600 as used in systems for presenting user-specific revision markings when rendering a shared collaboration object in a multi-user environment. As an option, one or more variations of collaboration object version management data structures 600 or any aspect thereof may be implemented in the context of the architecture and functionality of the embodiments described herein. The collaboration object version management data structures 600 or any aspect thereof may be implemented in any environment.

FIG. 6 illustrates one aspect pertaining to maintaining a history of user-views of a collaboration object so as to calculate user-specific changes relative to the specific user's last view. Specifically, the figure is being presented with respect to its contribution to addressing the problem of determining a last accessed version for a particular user. The figure presents two data structures: (1) a last view table 602 that indexes a last view version by objectID and userID, and (2) a most current version table 604 that is indexed by objectID.

Using these data structures, version selectors, such as earlier version selector 342 of FIG. 3A and/or current version selector 344 of FIG. 3A, can efficiently index into the data structures to retrieve the corresponding version number. The version number in turn can be used in a query to access the object storage to retrieve the collaboration object with the specified version number and/or to retrieve a timestamp or sequence identifier of a last accessed version for a particular user.

Figure 7:
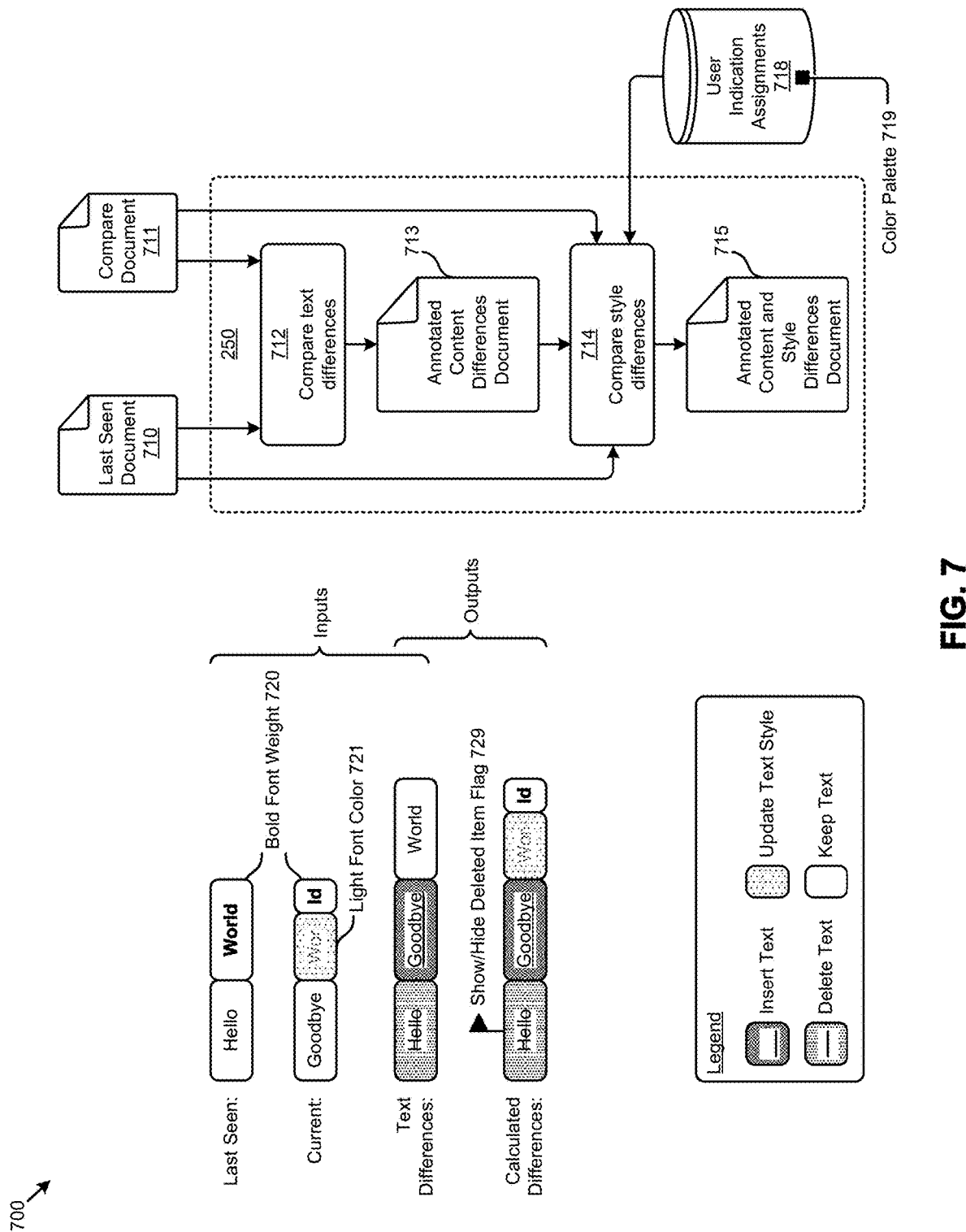
FIG. 7 depicts a difference annotation technique as used in systems for presenting user-specific revision markings when rendering a shared collaboration object in a multi-user environment, according to an embodiment.

FIG. 7 depicts a difference annotation technique 700 as used in systems for presenting user-specific revision markings when rendering a shared collaboration object in a multi-user environment. As an option, one or more variations of difference annotation technique 700 or any aspect thereof may be implemented in the context of the architecture and functionality of the embodiments described herein. The difference annotation technique 700 or any aspect thereof may be implemented in any environment.

FIG. 7 is illustrative of one technique for annotating style differences into a differences document. The figure presents a data flow to compare text differences between two documents as well as a data flow to compare style differences between two documents. Specifically, an embodiment of method 250 is used to compare text differences. As shown, method 712 receives a last seen document 710 and a compare document 711. The text differences are identified and, for each change determined, the characteristics of the changes are annotated to produce the shown annotated content differences document 713. Strictly as one example, inserted text might be annotated using an underlining annotation graphical user interface feature, whereas deleted text might be annotated using a strikethrough annotation graphical user interface feature.

Method 714 serves to compare style differences. As shown, the method takes in four inputs, specifically, a last seen document 710, a compare document 711, the annotated content differences document 713, and a set of user indication assignments 718. Detected content style differences are annotated using user indication assignments 718 together with any color palette 719 assignments to generate the annotated content and style differences document 715.

The style differences can be annotated using any known methods, however, in this specific example, style annotation includes markup using fills (e.g., a first fill for "insert text", a second fill for "delete text", etc.). Additionally, still more fills and flags can be used to annotate changes to styles. As shown, certain portions of the word "World" are depicted in bold font weight 720, whereas other portions of the word "World" are depicted in light font color 721. It will be appreciated that the annotation of style changes use styles for the annotations of the styles themselves, therefore any particular markup document might include a custom set of fills and a custom legend such that a user can distinguish style changes as are applied to a collaboration document as compared to styles applied to style changes so as to highlight such style changes to the user.

In some cases, a user might want to hide deleted text, since it is deleted. In other cases, a user might want to see deleted text so as to know, for example, who changed what. Accordingly, a show/hide deleted item flag 729 serves as a toggle widget that can be activated by user input such as touch, or click, or hover, or other focus indication so as to control one or more visibility options.

Figure 8A:
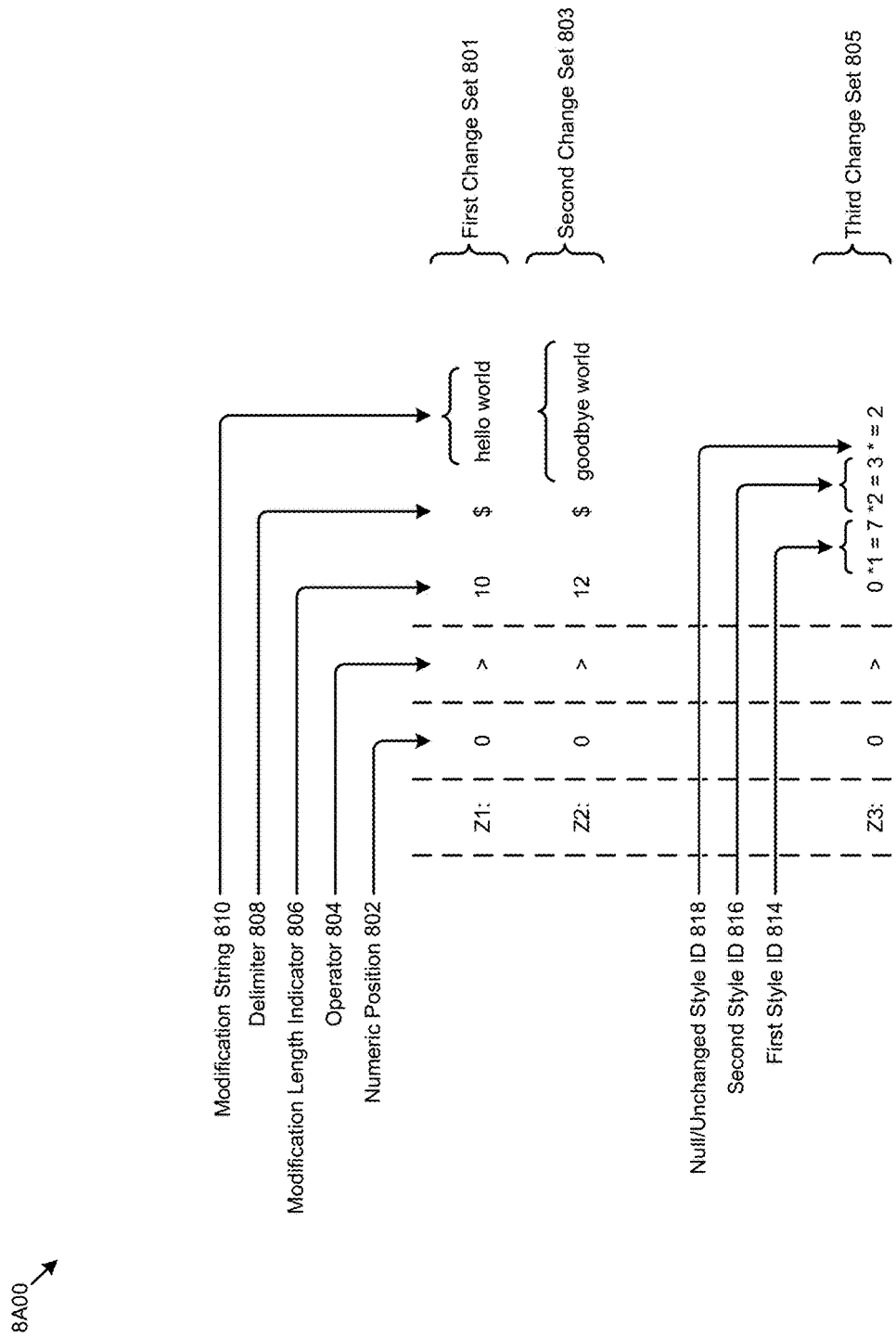
FIG. 8A depicts a content change codification technique as used in systems for presenting user-specific revision markings when rendering a shared collaboration object in a multi-user environment, according to an embodiment.

FIG. 8A depicts a content change codification technique 8A00 as used in systems for presenting user-specific revision markings when rendering a shared collaboration object in a multi-user environment. As an option, one or more variations of content change codification technique 8A00 or any aspect thereof may be implemented in the context of the architecture and functionality of the embodiments described herein. The content change codification technique 8A00 or any aspect thereof may be implemented in any environment.

As earlier indicated, a particular version of a collaboration document can be saved as a version to object storage. Alternatively, a sequence of snapshots (e.g., only changes) to a base document can be saved, and any version can be constructed by successively applying snapshots in sequence.

One way to capture changes in a manner than can be later applied (e.g., to a base document) is to capture sets of changes in successions of change statements. The example of FIG. 8A depicts three different change statements that codify three different change sets, specifically first change set 801, second change set 803, and third change set 805. Each change set is presented with a statement identifier (e.g., Z1, Z2, and Z3) followed by strings comprising operators, operands, and delimiters. The shown first change set 801 and second change set 803 each characterize text-oriented changes, whereas third change set 805 characterizes style-oriented changes.

The characterized text-oriented changes are composed of a numeric position indicator 802 (e.g., where to start to apply the change), an operator 804 (e.g., a ">" to add or insert characters, or a different character signifying an operator to remove characters), a modification length indicator 806, a delimiter 808, and a modification string 810. The shown first change set 801 adds the text "hello world" starting at position '0'. The second change set 803 adds the characters of the string "goodbye world" starting at position '0'.

The style-oriented change (e.g., statement Z3) uses numeric style identifiers (e.g., "*1", "*2", and "*") as a notational shorthand. The designation "1" refers to a first style ID 814 that is applied in succession starting at position 0 for a length of 7 characters. The designation "*2" refers to a second style ID 816 that is applied in succession for 3 characters, and the designation "*" (with no numeric part) refers to a null or unchanged style 818 that is applied in succession for 2 characters. Any number of such change statements can be applied to strings in a document. A table or other data structure can serve to hold the expanded definition of a style (e.g., a cascading style sheet (CSS) style) that corresponds to the notational shorthand. Table 1 is an example of such a table or data structure.

TABLE 1

| Style map | |
|---|---|
| Style ID | CSS Style |
| *1 | StyleID1 |
| *2 | StyleID2 |
| *3 | StyleID3 |

Figure 8B:
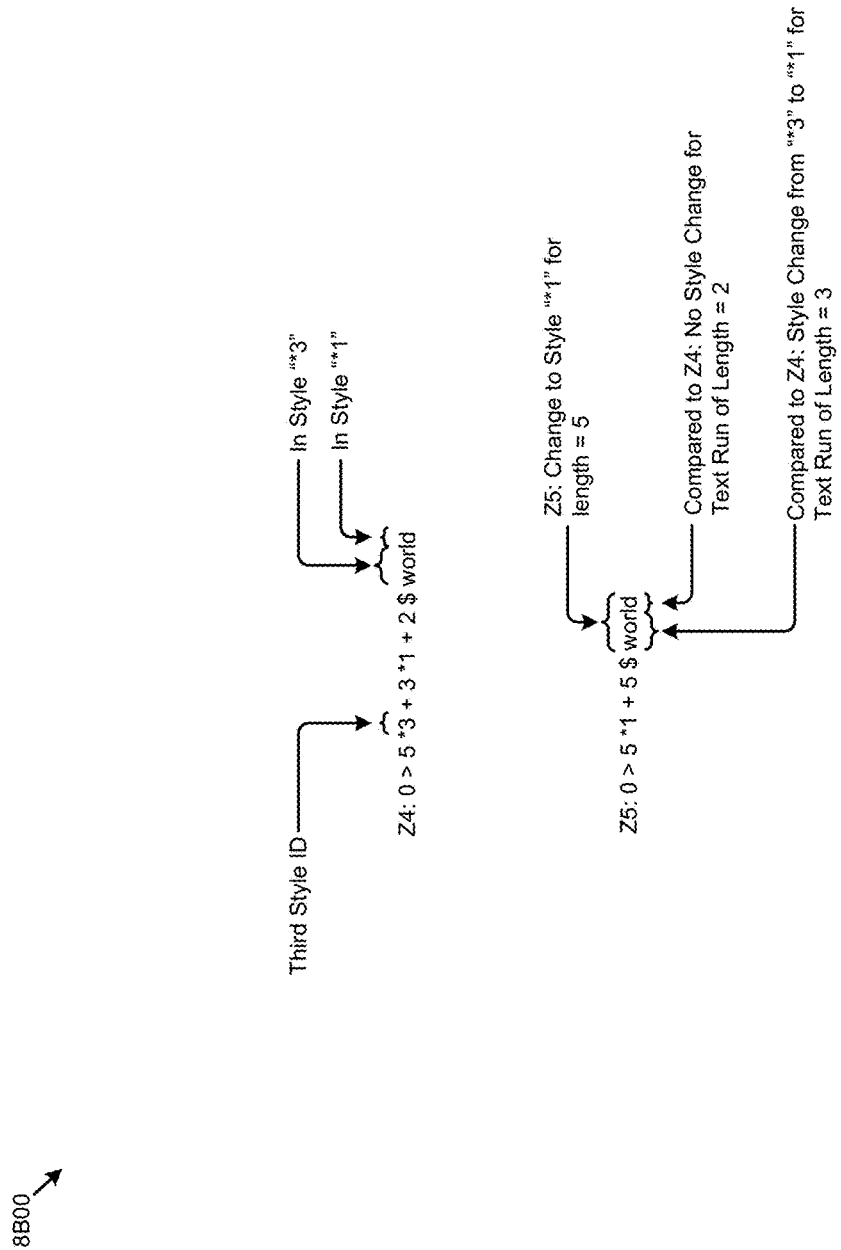
FIG. 8B depicts a content change difference detection technique as used in systems for presenting user-specific revision markings when rendering a shared collaboration object in a multi-user environment, according to an embodiment.

FIG. 8B depicts a content change difference detection technique 8B00 as used in systems for presenting user-specific revision markings when rendering a shared collaboration object in a multi-user environment. As an option, one or more variations of content change difference detection technique 8B00 or any aspect thereof may be implemented in the context of the architecture and functionality of the embodiments described herein. The content change difference detection technique 8B00 or any aspect thereof may be implemented in any environment.

FIG. 8B illustrates two transformation statements used to calculate user-specific style changes relative to the specific user's last view. Specifically, the figure is being presented with respect to its contribution to addressing the problem of generating and displaying a set of collaboration object style changes that are relative to a particular user's history of views.

As shown, the transformation statement Z4 depicts applying style "*3" to the first three characters of the word "world", and applying style "*1" to the last two characters of the word "world". Transformation statement Z5 depicts application of the style "*1" being applied to the entire word "world". By comparing the transformation statements, the style changes between any two states can be determined. In this particular example, when comparing transformation statement Z4 to transformation statement Z5, there is a style change to style "*3" to the first three characters of the word "world" and there is no change to the last two characters of the word "world". In this manner, OT statements can be used to determine style changes made to text by any succession of transformation statements.

Additional Embodiments of the Disclosure

Additional Practical Application Examples

Figure 9:
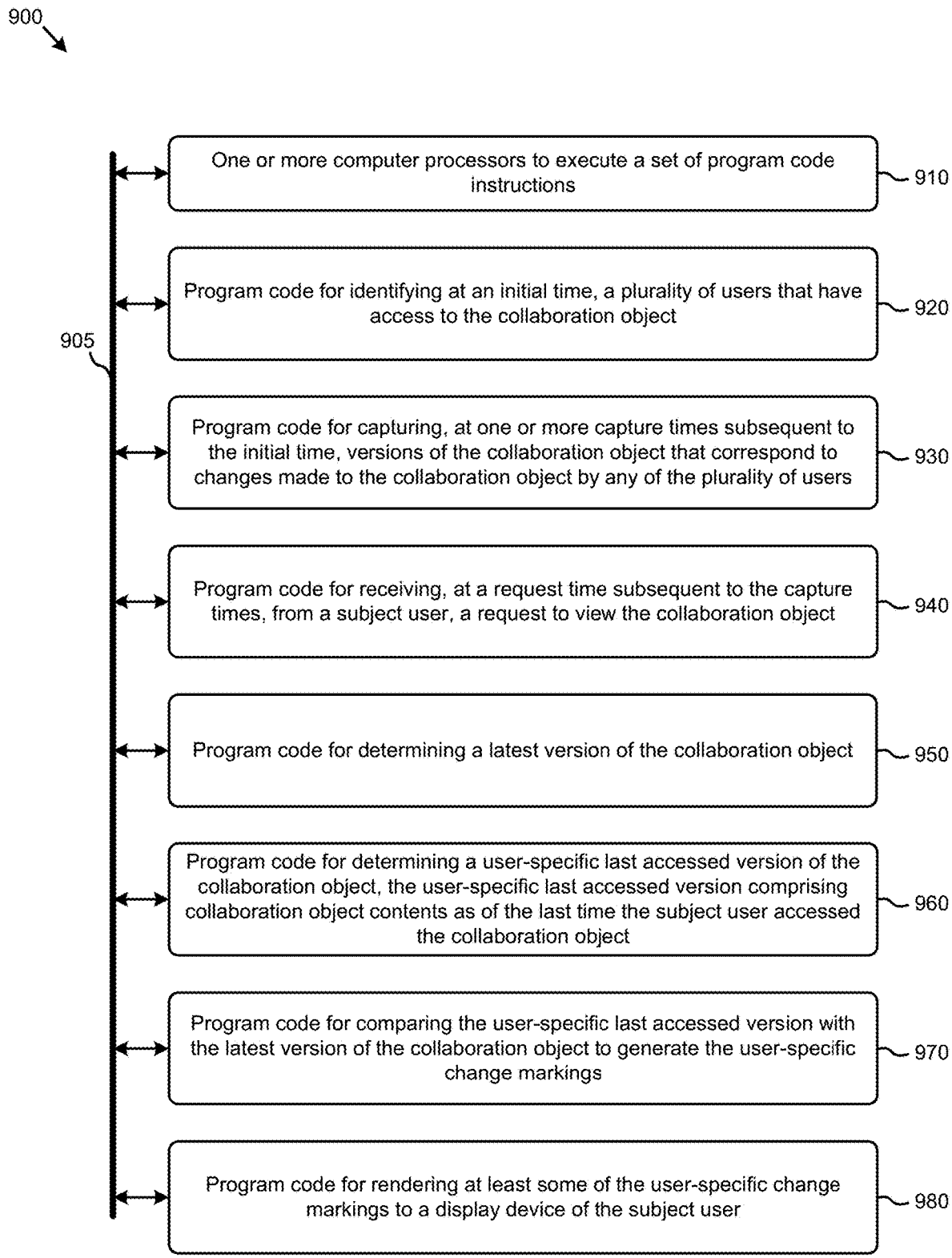
FIG. 9 depicts system components as arrangements of computing modules that are interconnected so as to implement certain of the herein-disclosed embodiments.

FIG. 9 depicts a system 900 as an arrangement of computing modules that are interconnected so as to operate cooperatively to implement certain of the herein-disclosed embodiments. This and other embodiments present particular arrangements of elements that, individually and/or as combined, serve to form improved technological processes that address generating and displaying a set of collaboration object changes that are relative to a particular user's history of views. The partitioning of system 900 is merely illustrative and other partitions are possible.

Variations of the foregoing may include more or fewer of the shown modules. Certain variations may perform more or fewer (or different) steps and/or certain variations may use data elements in more or in fewer (or different) operations. As an option, the system 900 may be implemented in the context of the architecture and functionality of the embodiments described herein. Of course, however, the system 900 or any operation therein may be carried out in any desired environment.

The system 900 comprises at least one processor and at least one memory, the memory serving to store program instructions corresponding to the operations of the system. As shown, an operation can be implemented in whole or in part using program instructions accessible by a module. The modules are connected to a communication path 905, and any operation can communicate with other operations over communication path 905. The modules of the system can, individually or in combination, perform method operations within system 900. Any operations performed within system 900 may be performed in any order unless as may be specified in the claims.

The shown embodiment implements a portion of a computer system, presented as system 900, comprising one or more computer processors to execute a set of program code instructions (module 910) and modules for accessing memory to hold program code instructions to perform: identifying at an initial time, a plurality of users that have access to the collaboration object (module 920); capturing, at one or more capture times subsequent to the initial time, versions of the collaboration object that correspond to changes made to the collaboration object by any of the plurality of users (module 930); receiving, at a request time subsequent to the capture times, from a subject user, a request to view the collaboration object (module 940); determining a latest version of the collaboration object (module 950); determining a user-specific last accessed version of the collaboration object, the user-specific last accessed version comprising collaboration object contents as of the last time the subject user accessed the collaboration object (module 960); comparing the user-specific last accessed version with the latest version of the collaboration object to generate the specific user change markings (module 970); and rendering at least some of the user-specific change markings to a display device of the subject user (module 980).

System Architecture Overview

Additional System Architecture Examples

FIG. 10A depicts a block diagram of an instance of a computer system 10A00 suitable for implementing embodiments of the present disclosure. Computer system 10A00 includes a bus 1006 or other communication mechanism for communicating information. The bus interconnects subsystems and devices such as a central processing unit (CPU), or a multi-core CPU (e.g., data processor 1007), a system memory (e.g., main memory 1008, or an area of random access memory (RAM)), a non-volatile storage device or non-volatile storage area (e.g., read-only memory 1009), an internal storage device 1010 or external storage device 1013 (e.g., magnetic or optical), a data interface 1033, a communications interface 1014 (e.g., PHY, MAC, Ethernet interface, modem, etc.). The aforementioned components are shown within processing element partition 1001, however other partitions are possible. Computer system 10A00 further comprises a display 1011 (e.g., CRT or LCD), various input devices 1012 (e.g., keyboard, cursor control), and an external data repository 1031.

According to an embodiment of the disclosure, computer system 10A00 performs specific operations by data processor 1007 executing one or more sequences of one or more program code instructions contained in a memory. Such instructions (e.g., program instructions $1002_1$, program instructions $1002_2$, program instructions $1002_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 10A00 performs specific networking operations using one or more instances of communications interface 1014. Instances of communications interface 1014 may comprise one or more networking ports that are configurable (e.g., pertaining to speed, protocol, physical layer characteristics, media access characteristics, etc.) and any particular instance of communications interface 1014 or port thereto can be configured differently from any other particular instance. Portions of a communication protocol can be carried out in whole or in part by any instance of communications interface 1014, and data (e.g., packets, data structures, bit fields, etc.) can be positioned in storage locations within communications interface 1014, or within system memory, and such data can be accessed (e.g., using random access addressing, or using direct memory access DMA, etc.) by devices such as data processor 1007.

Communications link 1015 can be configured to transmit (e.g., send, receive, signal, etc.) any types of communications packets (e.g., communication packet $1038_1$, communication packet $1038_N$) comprising any organization of data items. The data items can comprise a payload data area 1037, a destination address 1036 (e.g., a destination IP address), a source address 1035 (e.g., a source IP address), and can include various encodings or formatting of bit fields to populate packet characteristics 1034. In some cases, the packet characteristics include a version identifier, a packet or payload length, a traffic class, a flow label, etc. In some cases, payload data area 1037 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1007 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1031, which in turn can be formatted into any one or more storage areas, and which can comprise parameterized storage 1039 accessible by a key (e.g., filename, table name, block address, offset address, etc.).

Execution of the sequences of instructions to practice certain embodiments of the disclosure are performed by a single instance of a computer system 10A00. According to certain embodiments of the disclosure, two or more instances of computer system 10A00 coupled by a communications link 1015 (e.g., LAN, public switched telephone network, or wireless network) may perform the sequence of instructions required to practice embodiments of the disclosure using two or more instances of components of computer system 10A00.

Computer system 10A00 may transmit and receive messages such as data and/or instructions organized into a data structure (e.g., communications packets). The data structure can include program instructions (e.g., application code 1003), communicated through communications link 1015 and communications interface 1014. Received program code may be executed by data processor 1007 as it is received and/or stored in the shown storage device or in or upon any other non-volatile storage for later execution. Computer system 10A00 may communicate through a data interface 1033 to a database 1032 on an external data repository 1031. Data items in a database can be accessed using a primary key (e.g., a relational database primary key).

Processing element partition 1001 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1007. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to presenting user-specific revision markings when rendering a shared collaboration object in a multi-user environment. A module may include one or more state machines and/or combinational logic used to implement or facilitate the operational and/or performance characteristics pertaining to presenting user-specific revision markings when rendering a shared collaboration object in a multi-user environment.

Various implementations of database 1032 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of presenting user-specific revision markings when rendering a shared collaboration object in a multi-user environment). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to presenting user-specific revision markings when rendering a shared collaboration object in a multi-user environment, and/or for improving the way data is manipulated when performing computerized operations pertaining to maintaining a history of user-views of a collaboration object so as to calculate user-specific changes relative to the specific user's last view.

Figure 10B:
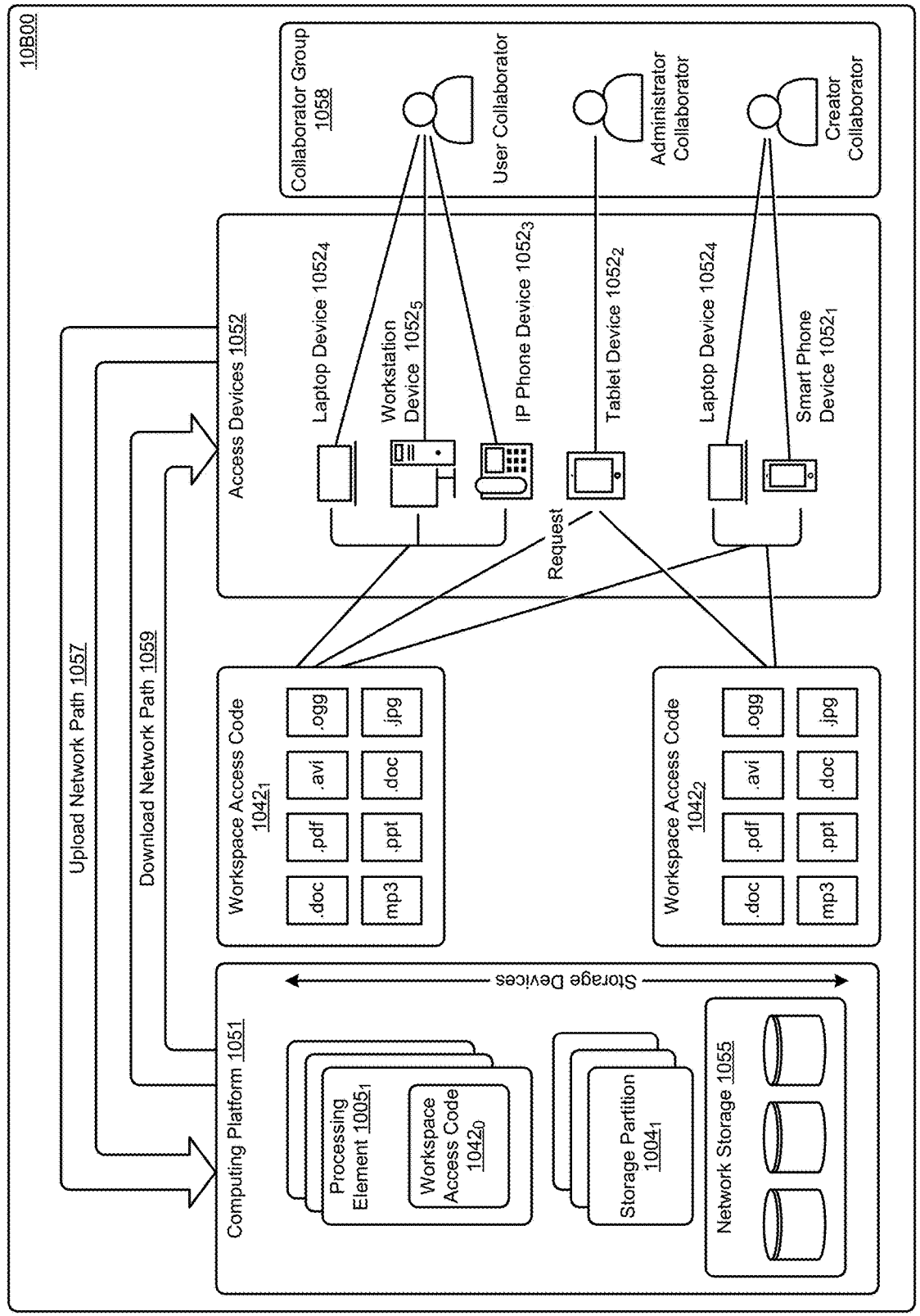

FIG. 10B depicts a block diagram of an instance of a cloud-based environment 10B00. Such a cloud-based environment supports access to workspaces through the execution of workspace access code (e.g., workspace access code $1042_0$, workspace access code $1042_1$, and workspace access code $1042_2$). Workspace access code can be executed on any of access devices 1052 (e.g., laptop device $1052_4$, workstation device $1052_5$, IP phone device $1052_3$, tablet device $1052_2$, smart phone device $1052_1$, etc.). A group of users can form a collaborator group 1058, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 1051, including in a middleware setting. As shown, a portion of the workspace access code resides in and can be executed on one or more processing elements (e.g., processing element 1005₁). The workspace access code can interface with storage devices such as networked storage 1055. Storage of workspaces and/or any constituent files or objects, and/or any other code or scripts or data can be stored in any one or more storage partitions (e.g., storage partition 1004₁). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 1057). A stored workspace can be delivered to a particular user and/or shared with other particular users via a download (e.g., a download from a processing element to an access device over a download network path 1059).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for applying user-specific change markings to a collaboration object, the method performed by a multi-user collaboration object sharing system and comprising:
    identifying a plurality of users that have access to the collaboration object;
    identifying a first user's last access time to the collaboration object;
    identifying a second user's last access time to the collaboration object, wherein contents of the collaboration object that is accessed at the second user's last access time is different from contents of the collaboration object that is accessed at the first user's last access time;
    receiving a first user request and a second user request to view the collaboration object, wherein the first user request and the second user request to view the collaboration object are received at one or more later points in time that are both later than the first user's last access time and later than the second user's last access time;
    displaying the collaboration object to the first user that includes a first set of content differences, the first set of content differences comprising first changes of the collaboration object between the first user's last access time and when the first user request is later received to view the collaboration object; and
    displaying the collaboration object to the second user that includes a second set of content differences, the second set of content differences comprising second changes of the collaboration object between the second user's last access time and when the second user request is later received to view the collaboration object, and a content difference is displayed to the first user or the second user based on a rule specific to a type of the collaboration object and corresponding to a collaborator that changed the collaboration object in which the change resulted in the content difference,
    wherein the first set of content differences displayed to the first user is different from the second set of content differences displayed to the second user when both the first user and the second user are viewing a same version of the collaboration object at the one or more later points in time based at least in part on earlier versions of the collaboration object viewed by the first and second user being different at the respective first and second user's last access times.

2. The method of claim 1, further comprising, formatting at least some of the first changes to present at least one of, one or more strikethrough characters, one or more underlined characters, or one or more highlighted characters.

3. The method of claim 1, further comprising, formatting at least some of the first changes to present the first changes as style changes.

4. The method of claim 1, further comprising capturing a plurality of versions of the collaboration object that correspond to changes made to the collaboration object by one or more of the plurality of users.

5. The method of claim 4, wherein the capturing the plurality of versions of the collaboration object comprises storing a version identifier in association with a particular one of the plurality of users.

6. The method of claim 4, wherein the collaboration object as of a particular version is at least one of, an in-memory version corresponding to an editing change event, or a saved version corresponding to a document save event.

7. The method of claim 6, wherein the particular version corresponds to the editing change event or the document of a particular user of the plurality of users.

8. The method of claim 1, wherein at least two of the plurality of users have access to the collaboration object through a rendering client comprising at least one of, a browser, a web app, or a native client.

9. The method of claim 1, further comprising receiving user input pertaining to one or more visibility options.

10. The method of claim 9, wherein a determination of at least some of the first changes is performed before receiving the user input pertaining to one or more visibility options.

11. A computer readable medium, embodied in a non-transitory computer readable medium, the non-transitory computer readable medium having stored thereon a sequence of instructions which, when stored in memory and executed by one or more processors causes the one or more processors to perform a set of acts for applying user-specific change markings to a collaboration object, the set of acts comprising:
    identifying a plurality of users that have access to the collaboration object;
    identifying a first user's last access time to the collaboration object;
    identifying a second user's last access time to the collaboration object, wherein contents of the collaboration object that is accessed at the second user's last access time is different from contents of the collaboration object that is accessed at the first user's last access time;
    receiving a first user request and a second user request to view the collaboration object, wherein the first user request and the second user request to view the collaboration object are received at one or more later points in time that are both later than the first user's last access time and later than the second user's last access time;

displaying the collaboration object to the first user that includes a first set of content differences, the first set of content differences comprising first changes of the collaboration object between the first user's last access time and when the first user request is later received to view the collaboration object; and displaying the collaboration object to the second user that includes a second set of content differences, the second set of content differences comprising second changes of the collaboration object between the second user's last access time and when the second user request is later received to view the collaboration object, and a content difference is displayed to the first user or the second user based on a rule specific to a type of the collaboration object and corresponding to a collaborator that changed the collaboration object in which the change resulted in the content difference, wherein the first set of content differences displayed to the first user is different from the second set of content differences displayed to the second user when both the first user and the second user are viewing a same version of the collaboration object at the one or more later points in time based at least in part on earlier versions of the collaboration object viewed by the first and second user being different at the respective first and second user's last access times.

12. The computer readable medium of claim 11, further comprising instructions which, when stored in memory and executed by the one or more processors causes the one or more processors to perform acts of, formatting at least some of the first changes to present at least one of, one or more strikethrough characters, one or more underlined characters, or one or more highlighted characters.

13. The computer readable medium of claim 11, further comprising instructions which, when stored in memory and executed by the one or more processors causes the one or more processors to perform acts of, formatting at least some of the first changes to present the first changes as style changes.

14. The computer readable medium of claim 11, further comprising instructions which, when stored in memory and executed by the one or more processors causes the one or more processors to perform acts of capturing a plurality of versions of the collaboration object that correspond to changes made to the collaboration object by one or more of the plurality of users.

15. The computer readable medium of claim 14, wherein the capturing the plurality of the versions of the collaboration object comprises storing a version identifier in association with a particular one of the plurality of users.

16. The computer readable medium of claim 14, wherein the collaboration object as of a particular version is at least one of, an in-memory version corresponding to an editing change event, or a saved version corresponding to a document save event.

17. The computer readable medium of claim 16, wherein the particular version corresponds to the editing change event or the document of a particular user of the plurality of users.

18. The computer readable medium of claim 11, wherein at least two of the plurality of users have access to the collaboration object through a rendering client comprising at least one of, a browser, a web app, or a native client.

19. A system for applying user-specific change markings to a collaboration object, the system performed by a multi-user collaboration object sharing system and comprising:

a storage medium having stored thereon a sequence of instructions; and one or more processors that execute the sequence of instructions to cause the one or more processors to perform a set of acts, the set of acts comprising, identifying a plurality of users that have access to the collaboration object;

identifying a first user's last access time to the collaboration object;

identifying a second user's last access time to the collaboration object, wherein contents of the collaboration object that is accessed at the second user's last access time is different from contents of the collaboration object that is accessed at the first user's last access time;

receiving a first user request and a second user request to view the collaboration object, wherein the first user request and the second user request to view the collaboration object are received at one or more later points in time that are both later than the first user's last access time and later than the second user's last access time;

displaying the collaboration object to the first user that includes a first set of content differences, the first set of content differences comprising first changes of the collaboration object between the first user's last access time and when the first user request is later received to view the collaboration object; and displaying the collaboration object to the second user that includes a second set of content differences, the second set of content differences comprising second changes of the collaboration object between the second user's last access time and when the second user request is later received to view the collaboration object, and a content difference is displayed to the first user or the second user based on a rule specific to a type of the collaboration object and corresponding to a collaborator that changed the collaboration object in which the change resulted in the content difference, wherein the first set of content differences displayed to the first user is different from the second set of content differences displayed to the second user when both the first user and the second user are viewing a same version of the collaboration object at the one or more later points in time based at least in part on earlier versions of the collaboration object viewed by the first and second user being different at the respective first and second user's last access times.

20. The system of claim 19, wherein the collaboration object is at least one of, an in-memory version corresponding to an editing change event, or a saved version corresponding to a document save event.

* * * * *